(12) United States Patent
Itoko et al.

(10) Patent No.: US 10,657,304 B1
(45) Date of Patent: May 19, 2020

(54) MAPPING LOGICAL QUBITS ON A QUANTUM CIRCUIT

(71) Applicant: INTERNATIONAL BUSINESS MACHINES CORPORATION, Armonk, NY (US)

(72) Inventors: Toshinari Itoko, Chigasaki (JP); Atsushi Matsuo, Funabashi (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/238,960

(22) Filed: Jan. 3, 2019

(51) Int. Cl.
   *G06F 17/50* (2006.01)
   *G06F 30/327* (2020.01)
   *G06N 10/00* (2019.01)
   *G06F 111/20* (2020.01)

(52) U.S. Cl.
   CPC ........... *G06F 30/327* (2020.01); *G06N 10/00* (2019.01); *G06F 2111/20* (2020.01)

(58) Field of Classification Search
   CPC .... G06F 30/327; G06F 2111/20; G06N 10/00
   USPC ........................................................ 716/105
   See application file for complete search history.

(56) References Cited

U.S. PATENT DOCUMENTS

| | | | |
|---|---|---|---|
| 8,913,900 B2* | 12/2014 | Lukin | H04B 10/70 398/176 |
| 9,779,359 B2 | 10/2017 | Svore et al. | |
| 10,404,287 B2* | 9/2019 | Haah | H03M 13/13 |
| 2006/0123363 A1* | 6/2006 | Williams | G06N 10/00 716/101 |

OTHER PUBLICATIONS

Zulefiner, A. et al., "An Efficient Methodology for Mapping Quantum Circuits to the IBM QX Architectures" arXiv: 1712.04722v3 (Jun. 2018) pp. 1-11.

Matsuo, A. et al., "Changing the Gate Order for Optimal LNN Conversion" Reversible Computation (Jul. 2011) pp. 1-12, vol. 7165.

(Continued)

*Primary Examiner* — Jack Chiang
*Assistant Examiner* — Brandon Bowers
(74) *Attorney, Agent, or Firm* — Tutunjian & Bitetto, P.C.; Vazken Alexanian

(57) ABSTRACT

Swap insertion in mapping logical qubits on a quantum circuit is performed by obtaining an operation sequence including a plurality of operations to be executed on a quantum circuit. The quantum circuit including a plurality of physical qubits and a plurality of couplings. Finding a blocking set of operations including leading unresolved operation in the operation sequence. Calculating a first coupling score for each coupling of the plurality of couplings based on total reduction of shortest path lengths of a plurality of unresolved operations of the plurality of operations Selecting a coupling based on the first coupling score of each coupling. Updating the blocking set by removing any leading unresolved operations from the blocking set that can be performed after swapping a pair of logical qubits stored in a pair of physical qubits connected by the selected coupling.

25 Claims, 12 Drawing Sheets

(56) References Cited

OTHER PUBLICATIONS

Wille, R. et al., "Look-ahead Schemes for Nearest Neighbor Optimization of 1D and 2D Quantum Circuits" 2016 21st Asia and South Pacific Design Automation Conference (ASP-DAC) (Jan. 2016) pp. 1-6.

Wille, R. et al., "Optimal SWAP Gate Insertion for Nearest Neighbor Quantum Circuits" 2014 19th Asia and South Pacific Design Automation Conference (ASP-DAC) (Jan. 2014) pp. 1-6.

"QISKit" https://github.com/QISKit/qiskit-sdk-py, accessed on Aug. 27, 2018, pp. 1-27.

* cited by examiner

Set U = {CNOT(b0,b3), CNOT(b1,b4)}
Layout l={b0:q0, b1:q1, b2:q2, b3:q3, b4:q4}

MG((q0,q2);l)={(b0,b3)}
SP_G(l(b0), l(b3)): q0->q2->q3
SP_G(l(b1), l(b4)): q1->q2->q3->q4 include(l(b0), SP_G(l(b0), l(b3))) = 1
include(l(b0), SP_G(l(b1), l(b4))) = 0
include(l(b3), SP_G(l(b0), l(b3))) = 1
include(l(b3), SP_G(l(b1), l(b4))) = 1 subscore((q0, q2), l, U; G) = - 3 subscore((q1, q2), l, U; G) = - 2

```
rc = 1  #resolving_cost
subpaths_i_j = path_minus(pi, pj)
subpaths_j_i = path_minus(pj, pi)
if len(subpaths_i_j) == 2:
    if len(subpaths_j_i) == 2:
        rc = -1
    elif len(subpaths_j_i) == 1:
        rc = -1
    elif len(subpaths_j_i) == 0: #pi includes pj
        rc = 0
elif len(subpaths_i_j) == 1:
    if len(subpaths_j_i) == 2:
        rc = -1
    elif len(subpaths_j_i) == 1:
        if pi == subpaths_i_j:
            rc = 0
        else:
            rc = -1
elif len(subpaths_i_j) == 0:
    if len(subpaths_j_i) == 2:    #pj includes pi
        rc = 0
```

*FIG. 10*

|  | subpaths_i_j |||
|---|---|---|---|
|  | 0 | 1 | 2 |
| sub paths _j_i  0 | 1 | 1 | 0 |
| 1 | 1 | 0(*)/-1 | -1 |
| 2 | 0 | -1 | -1 |

(*) pi == subpaths_i_j

*FIG. 11*

MAPPING LOGICAL QUBITS ON A QUANTUM CIRCUIT

BACKGROUND

Technical Field

The present invention relates to swap insertion in mapping logical qubits on a quantum circuit. More specifically, the present invention relates to swap insertion in mapping logical qubits on a quantum circuit that can decrease the number of swap operations or swap gates used for a given quantum operation sequence.

Description of the Related Art

Recently, quantum computing has become one of the forefront technologies, and is gradually becoming more popular. For example, IBM® started a cloud service named "IBM Q Experience™®" that enables users to access a quantum computer through the Internet. A quantum computer has a quantum circuit including physical quantum bits, or qubits, and couplings. Each physical qubit stores a logical qubit, and each coupling is a connection between a pair of physical qubits that is configured to facilitate execution of a quantum operation on a pair of logical qubits stored therein.

From physical limitations of a physical quantum circuit, the number of couplings (i.e. number of pairs of physical qubits that can execute a quantum operation between them) is limited. Therefore, before performing a quantum operation on a pair of logical qubits, one logical qubit must often be moved until it is in a physical qubit adjacent to another physical qubit that contains the other logical qubit in the quantum operation, so that the quantum operation can be performed. A swap operation or a swap gate is used for moving logical qubits through a coupling. A pair of logical qubits stored in a pair of adjacent physical qubits that are coupled by a coupling are swapped.

SUMMARY

According to an embodiment of the present invention, provided is a computer-implemented method comprising obtaining an operation sequence including a plurality of operations to be executed on a quantum circuit. The quantum circuit including a plurality of physical qubits and a plurality of couplings Each physical qubit storing a logical qubit, and each coupling being a connection between a pair of physical qubits configured to facilitate execution of an operation on a pair of logical qubits stored in the pair of physical qubits. The method further comprising finding a blocking set of operations including at least one leading unresolved operation in the operation sequence. The method further comprising calculating a first coupling score for each coupling of the plurality of couplings based on total reduction of shortest path lengths of a plurality of unresolved operations of the plurality of operations. Wherein a shortest path length of an unresolved operation represents a minimum distance through couplings on the quantum circuit between a pair of physical qubits storing a pair of logical qubits to be used by the corresponding unresolved operation And wherein the total reduction of shortest path lengths is a total of the amounts by which each shortest path length would be reduced by swapping a pair of logical qubits stored in a pair of physical qubits connected by the corresponding coupling. The method further comprising selecting a coupling based on the first coupling score of each coupling, and updating the blocking set by removing any leading unresolved operations from the blocking set that can be performed after swapping a pair of logical qubits stored in a pair of physical qubits connected by the selected coupling. In this way, the computer-implemented method can effectively reduce the total shortest path length of the plurality of unresolved operations.

The updating may include updating the blocking set by adding a new leading unresolved operation in the operation sequence to the blocking set. The new leading unresolved operation becomes a leading unresolved operation after the removing the leading unresolved operation from the blocking set. In this way, the computer-implemented method can increase a probability of reducing the number of inserted swap operations in the operation sequence.

The plurality of unresolved operations may be a subset of all unresolved operations in the operation sequence. By limiting unresolved operations to be considered, the computer-implemented method can reduce the computational cost for calculating the first coupling score.

The calculating the first coupling score may include calculating the first coupling score of each coupling based on a weighted sum of reduction of a shortest path length of each unresolved operation. In this way, the computer-implemented method can give higher priority to resolve leading unresolved operations in the blocking set.

The calculating the first coupling score may include calculating a weight of reduction of a shortest path length of an unresolved operation of interest based on the number of unresolved operations on a dependency graph of the plurality of operations between the unresolved operation of interest and leading unresolved operations in the blocking set. In this way, the computer-implemented method can give higher priority to resolve unresolved operations that has smaller number of unresolved operations between leading unresolved operations in the blocking set.

The calculating the first coupling score may include calculating a weight of reduction of a shortest path length of an unresolved operation of interest based on a maximum distance on a dependency graph of the plurality of operations between the unresolved operation of interest and a leading unresolved operation in the blocking set. In this way, the computer-implemented method can give higher priority to resolve unresolved operations that has smaller distance from leading unresolved operations in the blocking set.

According to another embodiment of the present invention, provided is a computer program product including one or more computer readable storage mediums collectively storing program instructions that are executable by a processor or programmable circuitry to cause the processor or programmable circuitry to perform operations including obtaining an operation sequence including a plurality of operations to be executed on a quantum circuit. The quantum circuit including a plurality of physical qubits and a plurality of couplings. Each physical qubit storing a logical qubit, and each coupling being a connection between a pair of physical qubits configured to facilitate execution of an operation on a pair of logical qubits stored in the pair of physical qubits. The operations further including finding a blocking set of operations including at least one leading unresolved operation in the operation sequence, The operations further including calculating a first coupling score for each coupling of the plurality of couplings based on total reduction of shortest path lengths of a plurality of unresolved operations of the plurality of operations. Wherein a shortest path length of an unresolved operation represents a minimum distance through couplings on the quantum circuit between a pair of physical qubits storing a pair of logical qubits to be used by the corresponding unresolved operation And wherein the total reduction of shortest path lengths is a total of the amounts by which each shortest path length would be reduced by swapping a pair of logical qubits stored in a pair of physical qubits connected by the corresponding coupling The operations further including selecting a coupling based on the first coupling score of each coupling, and updating the blocking set by removing any leading unresolved operations from the blocking set that can be performed after swapping a pair of logical qubits stored in a pair of physical qubits connected by the selected coupling.

According to another embodiment of the present invention, provided is an apparatus including a processor or a programmable circuitry, and one or more computer readable mediums collectively including instructions that, when executed by the processor or the programmable circuitry, cause the processor or the programmable circuitry to obtain an operation sequence including a plurality of operations to be executed on a quantum circuit. The quantum circuit including a plurality of physical qubits and a plurality of couplings. Each physical qubit storing a logical qubit, each coupling being a connection between a pair of physical qubits configured to facilitate execution of an operation on a pair of logical qubits stored in the pair of physical qubits. The instruction further cause the processor to find a blocking set of operations including at least one leading unresolved operation in the operation sequence. The instruction further cause the processor to calculate a first coupling score for each coupling of the plurality of couplings based on total reduction of shortest path lengths of a plurality of unresolved operations of the plurality of operations. Wherein a shortest path length of an unresolved operation represents a minimum distance through couplings on the quantum circuit between a pair of physical qubits storing a pair of logical qubits to be used by the corresponding unresolved operation, and wherein the total reduction of shortest path lengths is a total of the amounts by which each shortest path length would be reduced by swapping a pair of logical qubits stored in a pair of physical qubits connected by the corresponding coupling. The instruction further cause the processor to select a coupling based on the first coupling score of each coupling, and update the blocking set by removing any leading unresolved operations from the blocking set that can be performed after swapping a pair of logical qubits stored in a pair of physical qubits connected by the selected coupling.

According to another embodiment of the present invention, provided is a quantum computing system including a quantum circuit including a plurality of physical qubits and a plurality of couplings. Each physical qubit storing a logical qubit, and each coupling being a connection between a pair of physical qubits configured to facilitate execution of an operation on a pair of logical qubits stored in the pair of physical qubits. The quantum computing system further including an apparatus for mapping a plurality of operations in an operation sequence to be executed on the quantum circuit Wherein the apparatus includes obtaining section for obtaining the operation sequence. The apparatus further includes a finding section for finding a blocking set of operations including at least one leading unresolved operation in the operation sequence. The apparatus further includes a calculating section for calculating a first coupling score for each coupling of the plurality of couplings based on total reduction of shortest path lengths of a plurality of unresolved operations of the plurality of operations. Wherein a shortest path length of an unresolved operation represents a minimum distance through couplings on the quantum circuit between a pair of physical qubits storing a pair of logical qubits to be used by the corresponding quantum operation. And wherein the total reduction of shortest path lengths is a total of the amounts by which each shortest path length would be reduced by swapping a pair of logical qubits stored in a pair of physical qubits connected by the corresponding coupling. The apparatus further includes a selecting section for selecting a coupling based on the first coupling score of each coupling, and an updating section for updating the blocking set by removing any leading unresolved operations from the blocking set that can be performed after swapping a pair of logical qubits stored in a pair of physical qubits connected by the selected coupling.

The summary clause does not necessarily describe all necessary features of the embodiments of the present invention. Not all features described in the summary are essential to the present invention. The present invention may also be a sub-combination of the features described above.

BRIEF DESCRIPTION OF THE DRAWINGS

FIG. 10 shows an example of a pair score according to an embodiment of the present invention.

FIG. 11 shows an example of a pair score according to an embodiment of the present invention.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
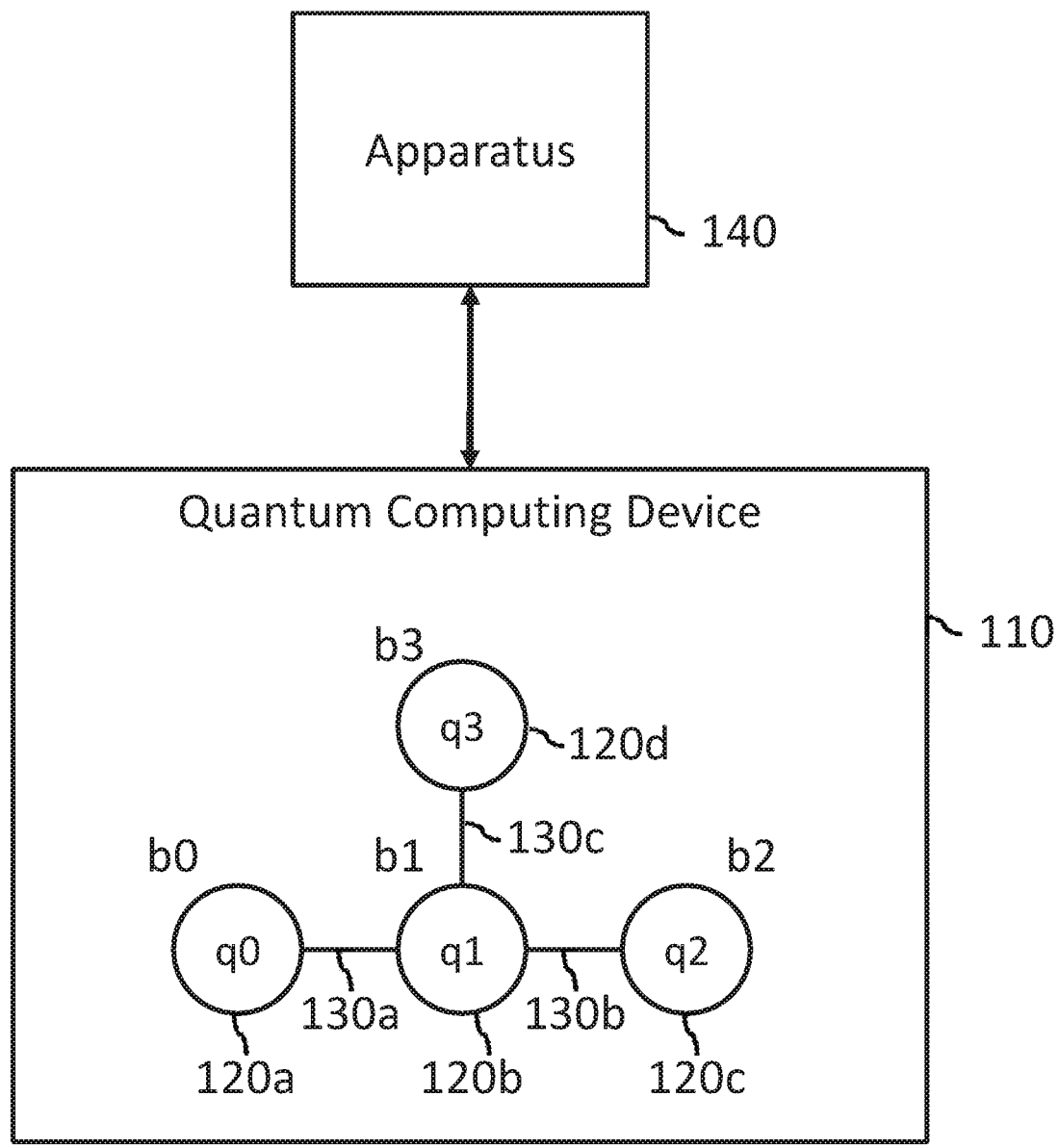
FIG. 1 shows a quantum computing system according to an embodiment of the present invention.

FIG. 1 shows quantum computing system 100 according to an embodiment of the present invention. Quantum computing system 100 includes quantum computing device 110 and apparatus 140.

Quantum computing device 110 includes a plurality of physical qubits 120a to 120d, which are individually or collectively referred to as physical qubit(s) 120, and a plurality of couplings 130a to 130c, which are individually or collectively referred to as coupling(s) 130. Each physical qubit 120 stores a logical qubit. Mathematically, each logical qubit has a state $|\psi\rangle = c_0|0\rangle + c_1|1\rangle$, which is a superposition of a state |0⟩ that corresponds to a bit value 0 and a state |1⟩ that corresponds to a bit value 1. Here, $c_0$ and $c_1$ are complex values such that $|c_0|^2+|\kappa_1|^2=1$.

Each coupling is a connection between a pair of physical qubits configured to facilitate execution of a quantum operation on a pair of logical qubits stored in the pair of physical qubits. In this specification, a "quantum operation" represents an instruction or a command to be applied to one or more quantum qubits, or a combination of instructions or commands in a programming language for quantum computing. For example, a "quantum operation" may represent a quantum gate, or a combination of quantum gates that can be treated as a single function. A "quantum operation" may be represented by a function block. For example, a function block may represent a quantum gate or a combination of quantum gates in a GUI for programming quantum computing algorithms. In this application, a "quantum operation" may be abbreviated to an "operation" if it is explicitly to be applied to one or more qubits.

Quantum operations can be categorized into single-qubit operations and multi-qubit operations. Examples of a single-qubit operation include a unitary gate, a Pauli X/Y/Z gate, a Hadamard gate, and a measurement gate. A single-qubit operation can be performed on a single qubit without using a coupling. Examples of a multi-qubit operation include a controlled unitary gate, a controlled not (CNOT) gate, and a swap gate. Multi-qubit operations are performed on multiple qubits (two qubits in these examples) connected by couplings (a single coupling in these two-qubit examples). In FIG. 1, a two-qubit operation can be performed on a pair of logical qubits b0 and b1 stored in a pair of physical qubits 120a(q0) and 120b(q1) by using coupling 130a, on a pair of logical qubits b1 and b2 stored in a pair of physical qubits 120b(q1) and 120c(q2) by using coupling 130b, and on a pair of logical qubits b1 and b3 stored in a pair of physical qubits 120b(q1) and 120d(q3) by using coupling 130c. However, a two-qubit operation on a pair of logical qubits b0 and b3 stored in 120a(q0) and 120d(q3) cannot be directly performed. In this case, a pair of logical qubits b0 and b1 stored in a pair of physical qubits 120a(q0) and 120b(q1) can be swapped by a swap operation to allow the two-qubit operation to be performed on a pair of logical qubits b0 and b3 stored in a pair of physical quits 120b(q1) and 120d(q3).

In other implementations, quantum computing device 110 has directional couplings. In such implementations, CNOT (q0,q1) can be performed but CNOT(q1,q0) cannot be directly performed. However, the direction of CNOT gate can be reversed by adding four Hadamard gates before and after the CNOT gate. Therefore, in this embodiment, couplings 130 are assumed to be non-directional for simplicity.

Apparatus 140 controls quantum computing device 110. Apparatus 140 may be a computer such as a server computer or a host computer. For example, apparatus 140 may be a business server, an engineering server, or a mainframe computer. Apparatus 140 may also be a computer such as a personal computer or a client computer. For example, apparatus 140 may be a desktop computer, a portable computer, or a tablet computer. Apparatus 140 may also be dedicated hardware for controlling quantum computing device 110.

Apparatus 140 obtains an operation sequence including a plurality of operations to be executed on a quantum circuit. The operation sequence is a sequence of quantum operations. The operation sequence is, for example, a program code including quantum operations or a logical quantum circuit including logical quantum gates.

Apparatus 140 maps a plurality of operations in an operation sequence to be executed on quantum computing device 110. For example, apparatus 140 assigns logical qubits to physical qubits 120a to 120d. Apparatus 140 also inserts one or more swap operations for swapping a pair of logical qubits stored in a pair of physical qubits 120 in order to move a pair of logical qubits to be used by an operation to physical qubits 120 that are coupled by a coupling 130.

Apparatus 140 controls quantum computing device 110 to execute the operation sequence. Then, apparatus 140 controls quantum computing device 110 to obtain the result of execution.

Figure 2:
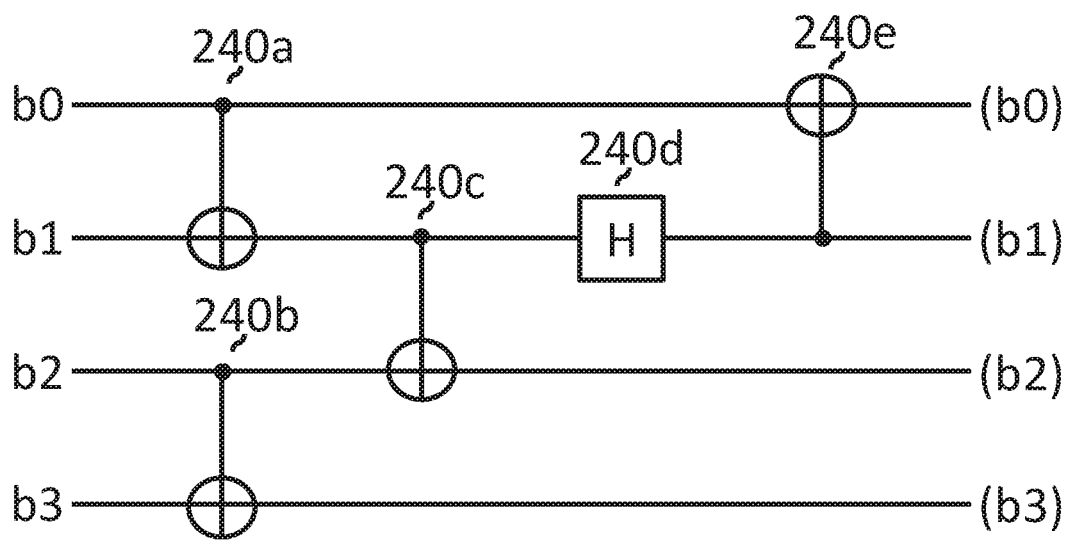
FIG. 2 shows an example of a logical quantum circuit according to an embodiment of the present invention.

FIG. 2 shows an example of logical quantum circuit 200 according to an embodiment of the present invention. Logical quantum circuit 200 is represented by text. Logical quantum circuit 200 is also referred to as an operation sequence. A text expression of logical quantum circuit 200 includes initial layout 210 and circuit definition 220. Initial layout 210 represents an initial allocation of a plurality of logical qubits b0 to b3 on a plurality of physical qubits q0 to q3. The allocation of logical qubits on physical qubits is also referred as a layout. Circuit definition 220 represents a plurality of quantum operations on one or more logical qubits. In the text expression of logical quantum circuit 200, a program order of quantum operations determines the order of execution of operations at least for the operations having a dependency on another operation. In general, operation Y depends on operation X if 1) operation X precedes operation Y and 2) the execution result of operations X and Y may be changed by changing the execution order of operations X and Y. For example, CNOT(b1, b2) depends on CNOT(b0, b1) because CNOT(b1, b2) inputs the target qubit b1 of CNOT(b0, b1) and therefore CNOT(b1,b2) must be executed after CNOT(b0, b1) is executed. CNOT(b2, b3) does not depend on CNOT(b0, b1) because CNOT(b2, b3) does not input outputs which may be modified by CNOT(b0, b1), and CNOT(b2, b3) does not modify qubits used by CNOT(b0, b1). In this application, an operation "uses" a logical qubit means that the operation inputs, outputs, or changes the logical qubit. In other words, the operation acts on the logical qubit.

In this embodiment, for illustrative purposes, two multi-qubit operations using at least one common logical qubit are considered to have dependency between them. For example, if CNOT(b0,b2) is next to CNOT(b0,b1) in the operation sequence, CNOT(b0,b2) depends on CNOT(b0,b1) even though the control qubit b0 of CNOT(b0,b1) is not mathematically changed. Since the state of a qubit may be slightly changed even if it is not mathematically changed by performing a quantum operation, it may be preferable to keep the original order in the operation sequence. In other embodiments, two multi-qubit operations using the same logical qubit are considered not to be dependent on each other if the logical qubit is not changed by them.

Logical circuit 230 is represented by a diagram. In logical circuit 230, logical qubits are represented by rows, and logical gates 240a to 240e are arranged on a logical qubit or between logical qubits to be used by each logical gate 240a to 240e. Logical gate 240a, logical gate 240b, logical gate 240c, and logical gate 240e are CNOT gates that input a dotted logical qubit as a control qubit, and input a circled logical qubit as a target qubit. Logical gate 240d is a Hadamard gate.

By comparing logical circuit 230 and quantum computing device 110 of FIG. 1, logical gate 240a can be performed through coupling 130a, logical gate 240c can be performed through coupling 130b, logical gate 240d can be performed on physical qubit 120b, and logical gate 240e can be performed through coupling 130a. However, logical gate 240*b* cannot be directly performed because logical qubits b2 and b3 are not coupled in the initial layout.

Figure 3:
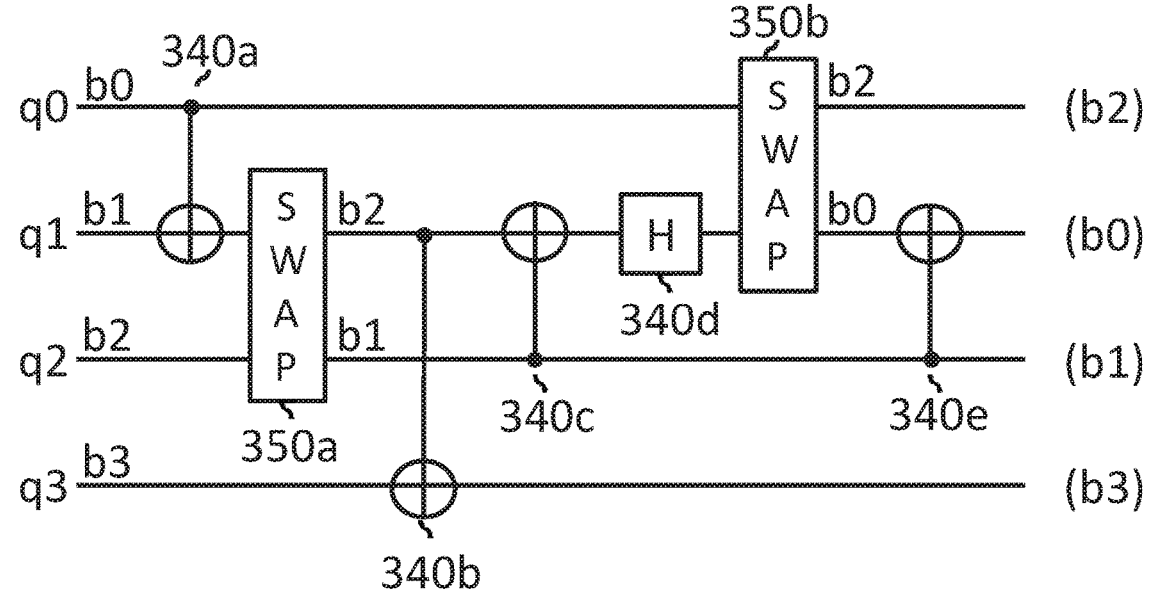
FIG. 3 shows an example of a physical quantum circuit according to an embodiment of the present invention.

FIG. 3 shows an example of physical quantum circuit 300 according to an embodiment of the present invention. Physical quantum circuit 300 is represented by text. Physical quantum circuit 300 is also referred to as an operation sequence, which is modified from the operation sequence of FIG. 2. A text expression of physical quantum circuit 300 includes initial layout 310 and circuit definition 320. Initial layout 310 represents an initial allocation of a plurality of logical qubits b0 to b3 on a plurality of physical qubits q0 to q3. Circuit definition 320 represents a plurality of quantum operations on one or more physical qubits. In the text expression of physical quantum circuit 300, a program order of quantum operations determines the order of execution of operations at least for the operations having a dependency.

Physical quantum circuit 330 is represented by a diagram. In physical quantum circuit 330, physical qubits are represented by rows, and each logical qubit is assigned to a physical qubit. Physical gates 340*a* to 340*e* are arranged on a physical qubit or between physical qubits to be used by each physical gate 340*a* to 340*e*.

As explained in reference to FIG. 2, CNOT(b2, b3) in logical quantum circuit 200 cannot be directly performed because q2 storing b2 and q3 storing b3 are not coupled. Therefore, an apparatus such as apparatus 140 inserts swap gate 350*a* (i.e. SWAP(q1, q2)) for swapping b1 and b2 in q1 and q2, respectively, before CNOT(b2, b3). After this swapping, logical qubits b1 and b2 are moved to physical qubits q2 and q1, respectively. Then, CNOT(b2, b3) in FIG. 2 can be performed by physical gate 340*b* (i.e. CNOT(q1, q3)) through coupling 130*c*. Before physical gate 340*e* (corresponds to CNOT(b1, b0) in FIG. 2), b1 and b0 are stored in q2 and q0, respectively. Since CNOT(b1, b0) cannot be directly performed, the apparatus inserts swap gate 350*b* (i.e. SWAP(q0, q1)) for swapping b0 and b2 in q0 and q1, respectively, before CNOT(b1, b0). After this swapping, logical qubits b1 and b0 are moved to physical qubits q2 and q1, respectively. Then, CNOT(b1, b0) in FIG. 2 can be performed by physical gate 340*e* (i.e. CNOT(q2, q1)) through coupling 130*b*.

Figure 4:
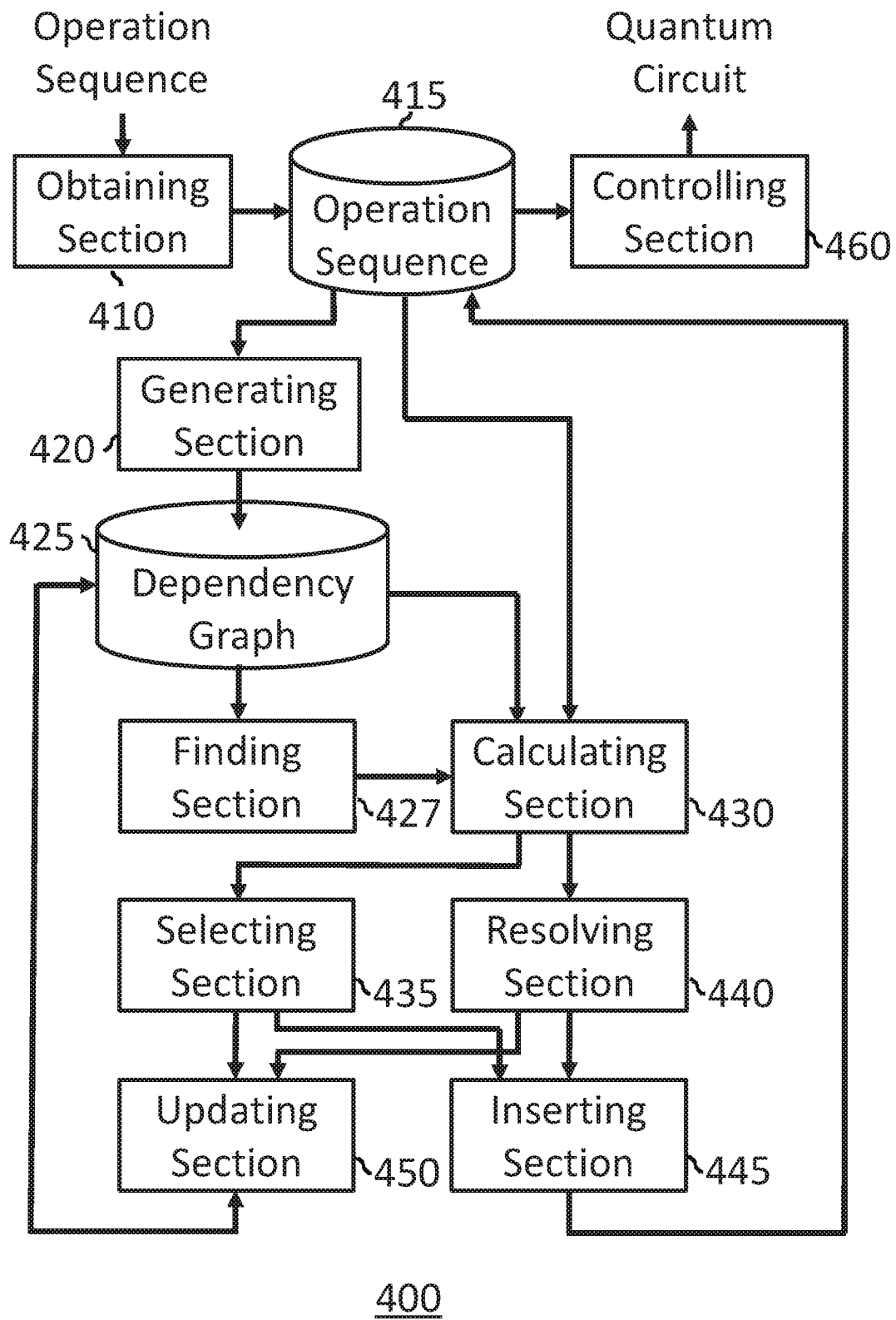
FIG. 4 shows an apparatus according to an embodiment of the present invention.

FIG. 4 shows apparatus 400 according to an embodiment of the present invention. Apparatus 400 can be a detailed version of apparatus 140 of FIG. 1 or an apparatus other than apparatus 140. Apparatus 400 includes obtaining section 410, operation sequence DB (database) 415, generating section 420, dependency graph DB (database) 425, finding section 427, calculating section 430, selecting section 435, resolving section 440, inserting section 445, updating section 450, and controlling section 460.

Obtaining section 410 obtains an operation sequence. For example, obtaining section 410 obtains an operation sequence, such as the operation sequences represented as logical quantum circuit 200 or logical circuit 230 in FIG. 2. Obtaining section 410 sends the operation sequence to operation sequence DB 415 and stores it in operation sequence DB 415. Operation sequence DB 415 is connected to obtaining section 410 and stores the operation sequence.

Generating section 420 is connected to operation sequence DB 415. Generating section 420 generates a dependency graph that represents dependencies among the plurality of operations in the operation sequence. Generating section 420 sends the dependency graph to dependency graph DB 425 and stores it in dependency graph DB 425. Dependency graph DB 425 is connected to generating section 420 and stores the dependency graph. The dependency graph includes a plurality of nodes and a plurality of edges. Each node represents an operation in the operation sequence in operation sequence DB 415. Each edge represents a dependency from a preceding operation to a succeeding operation in program order of the operation sequence or input-output order of the logical quantum circuit represented by the operation sequence. In this embodiment, generating section 420 initializes all operations (i.e. all nodes) as "unresolved." Operations that can be resolved without changing the layout are updated to "resolved" by updating section 450 before inserting a swap operation in the operation sequence.

Finding section 427 is connected to dependency graph DB 425. Finding section 427 finds a resolved set of operations including resolved operations in the operation sequence and an unresolved set of operations including unresolved operations in the operation sequence. In this embodiment, finding section 427 finds a node marked "resolved" in the dependency graph in dependency graph DB 425, and includes an operation corresponding to the node in the resolved set.

Finding section 427 finds the unresolved set in a similar manner. Finding section 427 finds a blocking set of operations including at least one leading unresolved operation in the operation sequence in operation sequence DB 415. In this embodiment, finding section 427 checks the dependency graph and finds an unresolved operation that does not depend on one or more unresolved operations and includes such unresolved operation in the blocking set. In other words, finding section 427 finds an unresolved operation that does not depend on any other operations or only depends on resolved operations as a leading unresolved operation to be included in the blocking set. Finding section 427 sends information about the resolved set, the unresolved set, and the blocking set to calculating section 430.

Calculating section 430 is connected to operation sequence DB 415, dependency graph DB 425, and finding section 427. Calculating section 430 calculates a coupling score for each coupling of the plurality of couplings, such as couplings 130*a* to 130*c* in FIG. 1. A coupling score for a coupling indicates an improvement of the layout with respect to resolving unresolved operations or leading unresolved operations by swapping the pair of logical qubits on the pair of physical qubits coupled by the corresponding coupling. In this embodiment, calculating section 430 also calculates a pair score for a pair of leading unresolved operations. A pair score for a pair of leading unresolved operations indicates a cost needs to resolve at least one of them.

Selecting section 435 is connected to calculating section 430. Selecting section 435 selects a coupling where a pair of logical qubits stored in a pair of physical qubits connected by the coupling is to be swapped based on the coupling score of each coupling. Selecting section 435 selects a coupling having the highest coupling score.

Resolving section 440 is connected to calculating section 430. Resolving section 440 selects a pair of leading unresolved operations based on the pair score and resolves at least one of the selected pair of leading unresolved operations. In this embodiment, resolving section 440 resolves a pair of leading unresolved operations if apparatus 400 expects that the layout will not improve by swapping a coupling selected by selecting section 435 any more than it will improve by resolving the pair of leading unresolved operations.

Inserting section 445 is connected to selecting section 435 and resolving section 440. Inserting section 445 inserts, into the operation sequence in operation sequence DB 415, a swap operation for swapping a pair of logical qubits in a pair of physical qubits coupled by the coupling selected by selecting section 435. Inserting section 445 also inserts, in the operation sequence, one or more swap operations needed for resolving the pair of leading unresolved operations selected by resolving section 440.

Updating section 450 is connected to selecting section 435 and resolving section 440. Updating section 450 checks whether one or more leading unresolved operations in the blocking set can be performed after the swapping selected by selecting section 435. If a leading unresolved operation can be performed after the swapping, updating section 450 removes this leading unresolved operation from the blocking set and the unresolved set in dependency graph DB 425, and adds it to the resolved set in dependency graph DB 425. Updating section 450 also removes a leading unresolved operation resolved by resolving section 440 from the blocking set and the unresolved set in dependency graph DB 425, and adds it to the resolved set in dependency graph DB 425. In this embodiment, updating section 450 marks a node corresponding to these leading unresolved operations as "resolved." Updating section 450 adds a new leading unresolved operation in the operation sequence to the blocking set in dependency graph DB 425 after removing some leading unresolved operations from the blocking set. In this embodiment, updating section 450 marks a node corresponding to the new unresolved operation as "leading" and "unresolved."

Controlling section 460 is connected to operation sequence DB 415. Controlling section 460 reads the operation sequence including the inserted swap operations after all operations are resolved, and controls the quantum computing device, such as quantum computing device 110, to execute the operation sequence. In another implementation, controlling section 460 may concurrently control the quantum circuit by control the quantum circuit to execute resolved operations while apparatus 400 is resolving other unresolved operations, if the physical qubits can hold quantum states long enough.

Figure 5:
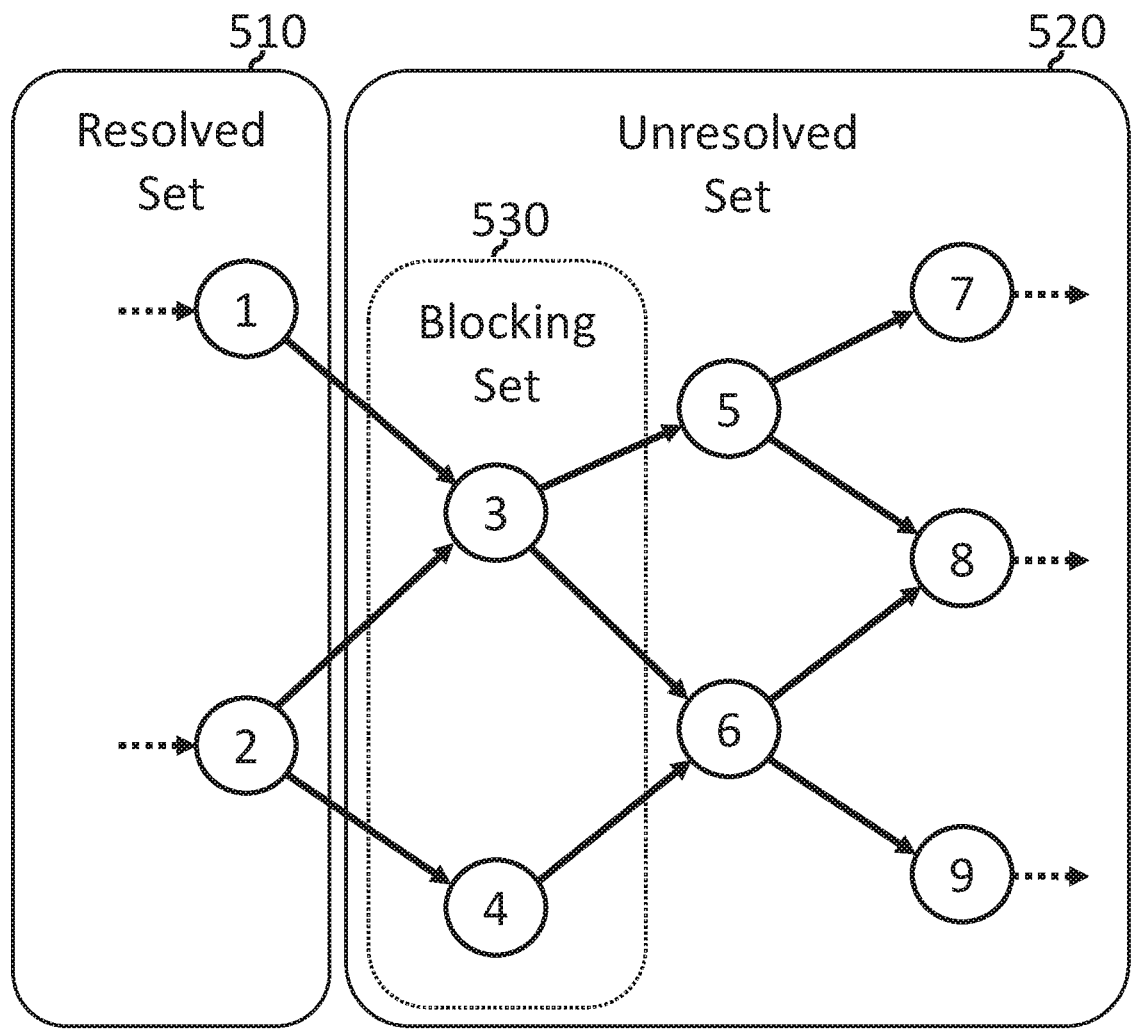
FIG. 5 shows an example of a dependency graph according to an embodiment of the present invention.

FIG. 5 shows an example of dependency graph 500 according to an embodiment of the present invention. Generating section 420 generates dependency graph 500 from the operation sequence in operation sequence DB 415. Generating section 420 scans the operation sequence in program order, and adds each operation as a node of dependency graph 500. If operation Y depends on operation X, generating section 420 adds a directed edge from a node of operation X to a node of operation Y. In an implementation, single-qubit operations are not included as nodes in the dependency graph under the premise that all physical qubits are configured to facilitate any type of single-qubit operations. In another implementation, single-qubit operations are also included as nodes in the dependency graph.

Operations are categorized into resolved operations and unresolved operations. Resolved operations are operations that are determined to be executable. If an operation does not depend on any other unresolved operations, then the operation can be performed in the layout at the timing that the operation is determined to be executable, and apparatus 400 can categorize the operation as a resolved operation. This does not necessarily mean that the resolved operations are actually executed operations. A node corresponding to a resolved operation is marked "Resolved" in dependency graph 500, and included in resolved set 510. "Resolved" means that the operation is determined to be executable.

Unresolved operations are operations that are not yet determined to be executable. Apparatus 400 initializes all nodes (i.e. all operations) as "unresolved" and updating section 450 updates nodes corresponding to newly resolved operations as "resolved." Unresolved operations are included in unresolved set 520.

Among unresolved operations in unresolved set 520, an unresolved operation that does not depend on any unresolved operations is defined as a leading unresolved operation, which is also referred to as a blocking operation. By this definition, a leading unresolved operation only depends on one or more resolved operations, or does not depend on any operations just after the initialization. Leading unresolved operations are included in blocking set 530, which is a subset of unresolved set 520.

The operation sequence is executable if all operations are resolved. Therefore, apparatus such as apparatus 140 or apparatus 400 inserts one or more swap operations into the operation sequence to resolve leading unresolved operations (e.g., operation 3 and 4). After one or more leading unresolved operations (e.g., operation 3) are changed to resolved operations, unresolved operations (e.g., operation 5) that only depend on the newly resolved operations become the new leading unresolved operations. By repeating this process, the apparatus eventually changes all operations to resolved by inserting all necessary swap operations in the operation sequence.

Figure 6:
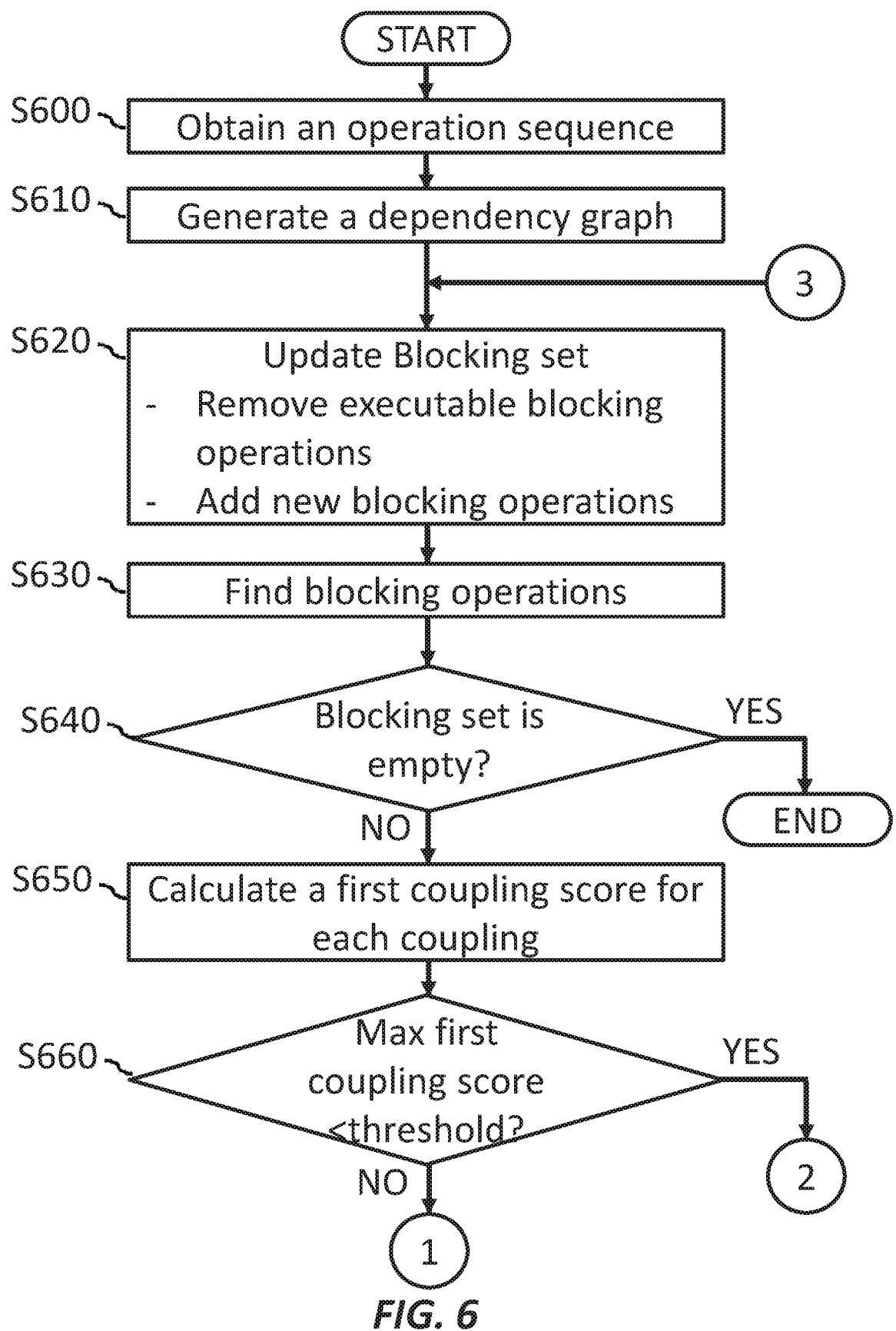
FIG. 6 shows an operational flow according to an embodiment of the present invention.
Figure 7:
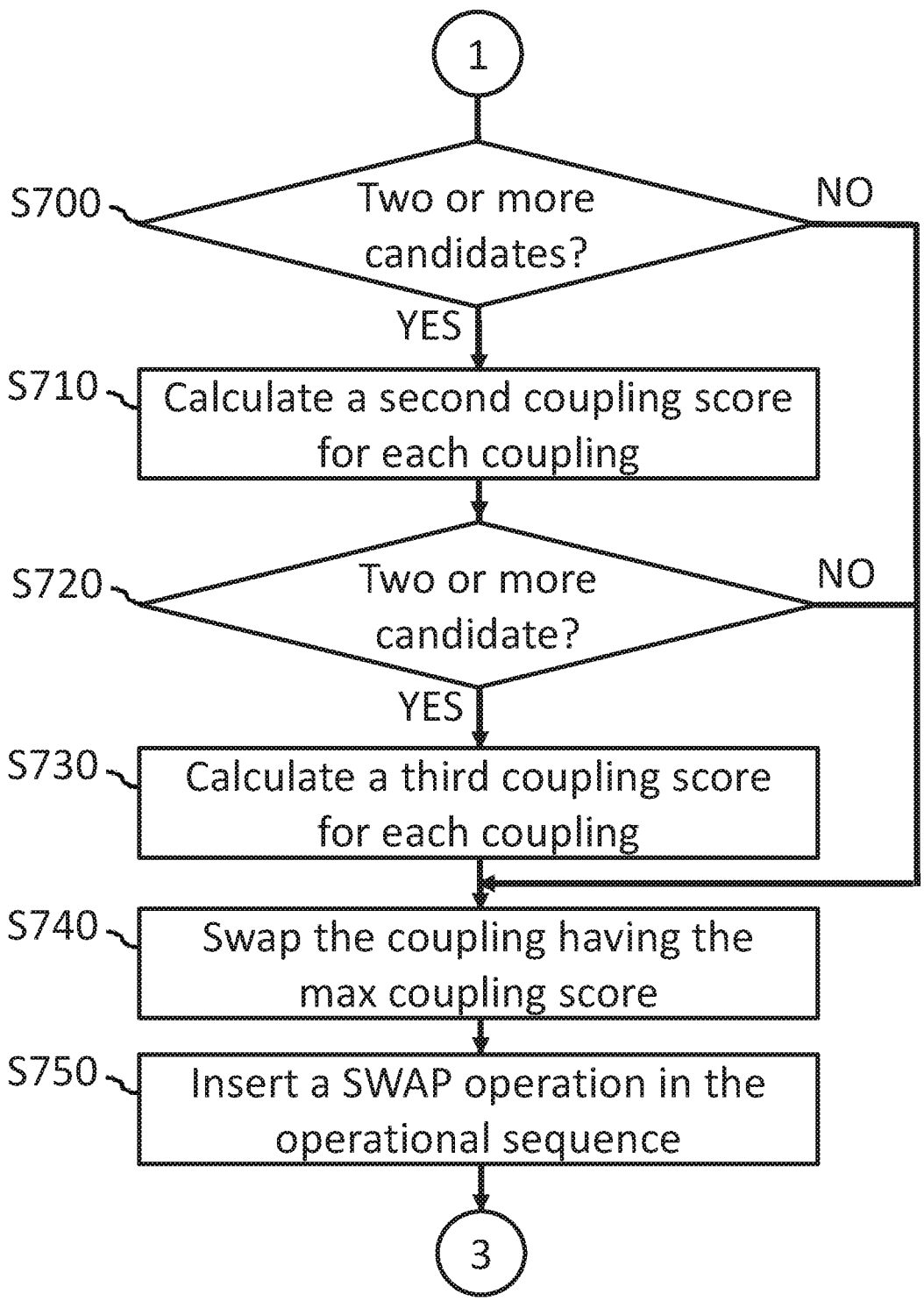
FIG. 7 shows an operational flow according to an embodiment of the present invention.
Figure 8:
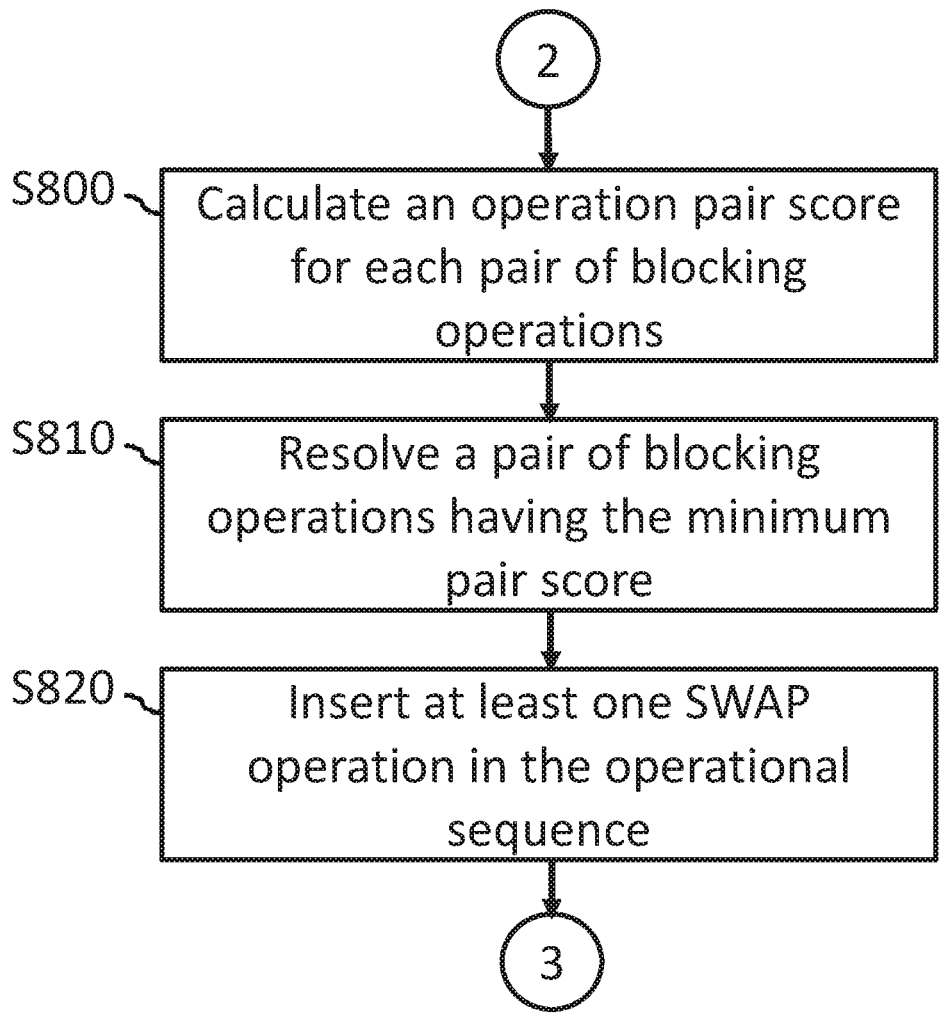
FIG. 8 shows an operational flow according to an embodiment of the present invention.

FIGS. 6 to 8 show an operational flow according to an embodiment of the present invention. FIGS. 6 to 8 show an operational flow for mapping an operation sequence on a physical quantum computing device such as quantum computing device 110. The operations of FIGS. 6 to 8 can be performed by, for example, apparatus 140 or apparatus 400 and its components that were explained in reference to FIG. 1 or 4. While the operational flow of FIGS. 6 to 8 will be explained in reference to apparatus 400 and its components, the operational flow can be performed by other apparatus having different components as well.

At Step 600 (S600) in FIG. 6, obtaining section 410 obtains an operation sequence. At S610, generating section 420 generates a dependency graph such as dependency graph 500 in FIG. 5. Generating section 420 initializes all nodes corresponding to all operations as "unresolved."

At S620, updating section 450 checks whether each operation can be resolved in the current layout. After the initialization, updating section 450 checks each node from upstream to downstream in the dependency graph in dependency graph DB 425. Updating section 450 marks a node corresponding to a leading unresolved operation as "leading" and "unresolved."

If a leading unresolved operation can be performed in the current layout, then the leading unresolved operation can be resolved. Updating section 450 basically determines that a single-qubit operation can be resolved in the current layout if the single-qubit operation is a leading unresolved operation under a premise that all physical qubits are configured to facilitate any type of single-qubit operations. In an implementation in which some physical qubits do not support the single-qubit operation of interest, a logical qubit used by the single-qubit operation must be moved to a physical qubit that supports the single-qubit operation. In such implementations, updating section 450 determines that the single-qubit cannot be resolved.

Updating section 450 determines that a multi-qubit operation can be resolved in the current layout if the multi-qubit operation is a leading unresolved operation and a pair of logical qubits to be used by the multi-qubit operation is in a pair of physical qubits that are coupled. A multi-qubit operation cannot be resolved even if it does not depend on any other operations if a pair of logical qubits used by the multi-qubit operation is not stored in a pair of physical qubits that are coupled. Updating section 450 resolves a leading unresolved operation, and another unresolved operation may become a leading unresolved operation. In this way, updating section 450 resolves all operations that can be performed in the initial layout before performing S630 at the first time. As iterations of the operational flow for mapping an operation sequence on a physical quantum circuit proceed, each leading unresolved operation can be resolved if the pair of logical qubits to be used by corresponding leading unresolved operation are moved to a pair of physical qubits that are coupled.

At S630, finding section 427 finds a resolved set, an unresolved set, and a blocking set from the dependency graph in dependency graph DB 425. Finding section 427 checks the dependency graph in dependency graph DB 425 and includes operations corresponding to nodes marked "resolved" in the resolved set. Finding section 427 checks the dependency graph in dependency graph DB 425 and includes operations corresponding to nodes marked "unresolved" in the resolved set. Finding section 427 checks the dependency graph in dependency graph DB 425 and includes operations corresponding to nodes marked "leading" and "unresolved" in the blocking set. The blocking set includes at least one leading unresolved operation (i.e. blocking operation) in the operation sequence.

At S640, finding section 427 checks whether the blocking set is empty or not. If the blocking set is empty, all operations are resolved, and then apparatus 400 completes the operation flow for mapping the operation sequence on the physical quantum circuit. If the blocking set is not empty, apparatus 400 proceeds to perform S650. In other implementations, finding section 427 checks whether the unresolved set is empty or not instead of checking the blocking set.

At S650, calculating section 430 receives the resolved set, the unresolved set, and the blocking set from finding section 427. Calculating section 430 calculates a first coupling score for each coupling of the plurality of couplings. In this embodiment, calculating section 430 calculates a first coupling score that is based on total reduction of shortest path lengths of a plurality of unresolved operations of the plurality of quantum operations. This total reduction of shortest path lengths is a total of the amounts by which each shortest path length would be reduced by swapping a pair of logical qubits stored in a pair of physical qubits connected by the corresponding coupling.

Here, C represents a coupling graph of the physical quantum circuit. C includes each physical qubit in the physical quantum circuit as a node, and each coupling between a pair of physical qubits as an edge between a pair of nodes corresponding to the pair of physical qubits. SP(g,l) represents a shortest path of an operation or logical gate g in the physical quantum circuit having a structure represented by coupling graph C under layout l. A shortest path SP(g,l) is a shortest path from a pair of logical qubits used by the operation g through couplings.

A shortest path length |SP(g,l)| of an unresolved operation g represents a minimum distance through couplings on the quantum circuit between a pair of physical qubits storing a pair of logical qubits to be used by the corresponding unresolved operation g. In this embodiment, the minimum distance is, or relates to, the number of couplings along the shortest path between the pair of physical qubits storing the pair of logical qubits to be used by the corresponding unresolved operation g. In this definition, the shortest path length |SP(g,l)| of an unresolved operation is 1 when the pair of logical qubits is stored in a pair of physical qubits that are coupled.

In another implementation, the minimum distance is, or relates to, the number of other physical qubits along the shortest path between the pair of physical qubits storing the pair of logical qubits to be used by the corresponding unresolved operation g. In this definition, the shortest path length |SP(g,l)| of an unresolved operation is 0 when the pair of logical qubits is stored in a pair of physical qubits that are coupled. If apparatus 400 needs to move a logical qubit used by a single-qubit operation g' to a physical qubit that supports the single-qubit operation g', the shortest path length |SP(g',l)| can be defined as the number of couplings along the shortest path between a physical qubit that stores the logical qubit and the nearest physical qubit that supports the single-qubit operation g'.

In this embodiment, the first coupling score of a coupling between a pair of physical qubits $(q_i, q_j)$ coupled by a coupling is calculated by the following expression (1).

$$cscore((q_i,q_j),l,U)=c(l,U)-c(l'(q_i,q_j),U) \text{ for } (q_i,q_j) \in C \qquad (1)$$

Here, U is a set of the plurality of unresolved operations that affects the coupling score. c(l,U) represents a sum total of shortest path lengths of unresolved operations in the set U under layout l. l'($q_i$, $q_j$) is a layout modified from the layout l by swapping the pair of logical qubits stored in the pair of physical qubits ($q_i$, $q_j$). cscore(($q_i$, $q_j$), l, U) represents a sum total of reductions of shortest path lengths of a plurality of unresolved operations in the set U. For example, if the total shortest path length can be reduced from 59 to 53 by swapping a coupling between a pair of physical qubits ($q_i$, $q_j$) then calculating section 430 calculates the first coupling score of this coupling as 6.

In an implementation, calculating section 430 uses all unresolved operations as the plurality of unresolved operations in the set U. In another implementation, the plurality of unresolved operations is a subset of all unresolved quantum operations in the operation sequence. Calculating section 430 may use a subset of all unresolved operations as the plurality of unresolved operations in the set U to reduce the workload for calculating the coupling score. Calculating section 430 can limit unresolved operations included in the set U based on the (minimum or maximum) distance of each unresolved operation from leading unresolved operations in the blocking set in the dependency graph.

For example, calculating section 430 determines the plurality of unresolved operations (i.e. the set U) based on a distance between a quantum operation in the blocking set and each unresolved operation in a dependency graph of the plurality of operations. Calculating section 430 includes an unresolved operation in the set U if it has a distance less than a threshold. This threshold can be 1 or more than 1 for calculating a first coupling score, and then the first coupling score is calculated based on the shortest path length of at least one unresolved operation which is not in the blocking set. For counting this distance, calculating section 430 may ignore single-qubit operations between a leading unresolved operation and the unresolved operation of interest under a premise that single-qubit operations can be performed without moving a logical qubits used by the single-qubit operations. By limiting unresolved operations included in the set U, apparatus 400 can reduce the computational cost for calculating the first coupling score.

In this embodiment, in order to give higher priority to resolving leading unresolved operations in the blocking set, calculating section 430 calculates the first coupling score of each coupling based on a weighted sum of reduction of a shortest path length of each unresolved quantum operation. $c(l,U)$ is calculated by the following expression (2).

$$c(l,U)=\Sigma_{q\in U}\gamma(g)|SP(g,l)| \quad (2)$$

Here, discount rate $\gamma(g)$ having a range of $0<\gamma(g)\leq 1$ is a weight for an unresolved operation g. Reduction of a shortest path length of an unresolved operation g is $|SP(g,l)|-|SP(g,l'(q_i,q_j))|$ and therefore calculating section 430 can calculate the weighted sum of reduction of a shortest path length of each unresolved quantum operation in the set U by expression (1).

In an implementation, calculating section 430 calculates a weight of reduction of a shortest path length of an unresolved operation of interest based on the number of unresolved operations in a dependency graph of the plurality of operations between the unresolved operation of interest and the at least one leading unresolved operation in the blocking set. For example, calculating section 430 calculates $\gamma(g)$ as $\alpha^{n(g,B)}(0<\alpha<1)$ where $n(g,B)$ is the number of unresolved operations (except for the unresolved operation of interest g) between the unresolved operation of interest g and the blocking set B. In this case, calculating section 430 calculates the weight $\gamma(8)$ for the unresolved operation 8 in FIG. 5 based on the number of unresolved operations in the dependency graph between the unresolved operation 8, and leading unresolved operations 3 and 4. The number is 4 (operations 3, 4, 5, and 6) since the unresolved operation 8 is not counted, and $\gamma(8)$ is $\alpha^4$. Alternatively, calculating section 430 may calculate $\gamma(g)$ by using any functions having a smaller value when the number becomes larger.

In another implementation, calculating section 430 calculates a weight of reduction of a shortest path length of an unresolved operation of interest based on a maximum distance on a dependency graph of the plurality of operations between the unresolved operation of interest and the at least one leading unresolved operation in the blocking set. For example, calculating section 430 calculates $\gamma(g)$ as $\alpha^{LP(g,B)}(0<\alpha<1)$ where $LP(g,B)$ is the longest path among the paths from a leading unresolved operation in the blocking set B and the unresolved operation of interest g in the dependency graph. In this case, calculating section 430 calculates the weight $\gamma(8)$ for the unresolved operation 8 in FIG. 5 based on the maximum distance between the unresolved operation of interest 8 and each of the leading unresolved operations 3 and 4. The maximum distance is 2 and $\gamma(8)$ is $\alpha^2$. Alternatively, calculating section 430 may calculate $\gamma(g)$ by using any functions having smaller value when the maximum distance becomes larger.

At S660, calculating section 430 checks whether the maximum first coupling score among first coupling scores of the plurality of couplings is less than a threshold. For example, this threshold is 1, 0, or any value that is determined by a user or a manufacturer of apparatus 400 that represents the minimum expectation or requirement of total reduction of shortest path length of the plurality of unresolved operations in the set U. If the maximum first coupling score is less than a threshold, apparatus 400 proceeds to perform S800 in FIG. 8.

At S700 in FIG. 7, selecting section 435 checks whether there are two or more candidates of couplings which have the maximum first coupling score. If there is only one candidate, then selecting section 435 selects a coupling having the maximum first coupling score, and apparatus 400 proceeds to execute S740.

At S710, calculating section 430 calculates a second coupling score of each coupling of the plurality of couplings based on reduction of a shortest path length of each leading unresolved operation in the blocking set. The second coupling score is similar to the first coupling score except that the second coupling score uses the blocking set as the set U in the expression (1). In this embodiment, the second coupling score is used for selecting one coupling among the candidates of couplings having the maximum first coupling score. For this purpose, calculating section 430 can calculate a second coupling score of each coupling among couplings having the maximum first coupling score.

At S720, selecting section 435 checks whether there are two or more candidates of couplings which have the maximum second coupling score. If there is only one candidate, then selecting section 435 selects a coupling where a pair of logical qubits stored in a pair of physical qubits connected by the coupling is to be swapped based on the second coupling score of each coupling. In this embodiment, selecting section 435 selects a coupling having the maximum second coupling score among the candidates of couplings having the maximum first coupling score, and apparatus 400 proceeds to perform S740. In another embodiment, calculating section 430 and selecting section 435 do not calculate nor use the second coupling scores, and the operational flow does not include S710 and S720.

At S730, calculating section 430 calculates a third coupling score of each coupling of the plurality of couplings. The third coupling score is explained in reference to FIG. 9. Selecting section 435 selects a coupling having the maximum third coupling score. In this embodiment, the third coupling score is used for selecting one coupling among the candidates of couplings having the maximum first and second coupling score. For this purpose, calculating section 430 can calculate a third coupling score of each coupling among couplings having the maximum first and second coupling score. In another embodiment, calculating section 430 and selecting section 435 do not calculate nor use the third coupling scores, and the operational flow does not include S730. If one candidate of coupling cannot be determined by the coupling scores calculated by calculating section 430, such as when no remaining candidate of coupling emerges with a higher third coupling score, then selecting section 435 may select one candidate of coupling based on a further method, such as random selection.

At S740, inserting section 445 swaps the pair of logical qubits stored in the pair of physical qubits coupled by the selected couplings in the current layout stored in operation sequence DB 415, and updates the current layout in operation sequence DB 415 with the new current layout.

At S750, inserting section 445 inserts a swap operation for swapping a pair of logical qubits stored in a pair of physical qubits connected by the selected coupling in the operation sequence preceding a leading unresolved operation using at least one logical qubit swapped by the swap operation. In an implementation, inserting section 445 inserts a swap operation preceding any leading unresolved operations in the operation sequence. Apparatus 400 proceeds to perform S620.

At S620 after executing the operational flow in FIG. 7, updating section 450 checks whether each leading unresolved operation can be resolved in the current layout. Updating section 450 updates the blocking set by removing any leading unresolved operations from the blocking set that can be performed after swapping a pair of logical qubits stored in a pair of physical qubits connected by the selected coupling. In this embodiment, updating section 450 marks the leading unresolved operation that can be performed after swapping as "resolved" in dependency graph DB 425 to remove this operation from the blocking set.

Updating section 450 also updates the blocking set by adding a new leading unresolved operation in the operation sequence to the blocking set. The new leading unresolved operation becomes a leading unresolved operation after removing the leading unresolved operation from the blocking set in S620. In this embodiment, updating section 450 marks the new leading unresolved operation as "leading" and "unresolved" in dependency graph DB 425. Updating section 450 may repeat the removal and addition of leading unresolved operations in the blocking set.

By inserting a swap operation for swapping a pair of logical qubits through the coupling selected based on the coupling score, apparatus 400 can effectively reduce the total shortest path length of the plurality of unresolved operations in the set U. Therefore, apparatus 400 can effectively reduce the number of swap operations inserted in the operation sequence.

In this embodiment, apparatus 400 repeats finding the blocking set in S630, calculating the coupling score and selecting the coupling to be swapped in at least one of S650, S710, and S730, inserting a swap operation in S750, and updating the blocking set in S620. By repeating them, apparatus 400 can resolve leading unresolved operations in the blocking set.

At S800, resolving section 440 resolves up to two leading unresolved operations in the blocking set in response to the first coupling score for every coupling being lower than a threshold (i.e. "Yes" at S660). In this embodiment, resolving section 440 tries to resolve two leading unresolved operations at once. For this purpose, calculating section 430 calculates a pair score representing at least one of a depending cost and a resolving cost of each pair of leading unresolved operations in the blocking set. The pair score is explained in reference to FIGS. 10 and 11.

At S810, resolving section 440 selects the two leading unresolved operations to be resolved based on the pair score. In this embodiment, since calculating section 430 calculates the pair score representing costs, resolving section 440 selects a pair of leading unresolved operations (i.e. blocking operations) having the minimum pair score.

At S820, inserting section 445 inserts at least one swap operation for resolving at least one of the pair of leading unresolved operations selected in S810. If the leading unresolved operation to be resolved uses a pair of logical qubits stored in a pair of physical qubits having at least three couplings between them, then inserting section 445 inserts multiple swap operations preceding this leading unresolved operation in the operation sequence. In one implementation, inserting section 445 tries to resolve both of the selected leading unresolved operations with the same swap operation(s). Apparatus 400 proceeds to perform S620.

At S620 after executing the operational flow in FIG. 8, updating section 450 updates the blocking set by removing leading unresolved operations resolved in S820. Updating section 450 also updates the blocking set by adding a new leading unresolved operation in the operation sequence to the blocking set. Updating section 450 may further update the blocking set by removing any leading unresolved operations from the blocking set that can be performed.

In this embodiment, apparatus 400 can select the coupling to be swapped based on the first coupling score that is calculated not only based on the reduction of the shortest path lengths of leading unresolved operations but also based on the reduction of the shortest path lengths of unresolved operations which are not in the blocking set.

Apparatus 400 can update the blocking set by removing resolved operations from the blocking set and adding new unresolved operations to the blocking set based on the dependencies of operations by using, for example, the dependency graph. Apparatus 400 does not necessarily divide the multi-qubit operations into layers nor resolve each layer before resolving an unresolved operation in the succeeding layers. Therefore, apparatus 400 can increase the flexibility of resolving unresolved operations and reduce the number of inserted swap operations in the operation sequence.

Apparatus 400 can select a coupling to be swapped based on at least one of the second coupling scores or the third coupling scores even when two or more couplings have the maximum first coupling score. Therefore, apparatus 400 can increase a probability of reducing the number of inserted swap operations into the operation sequence.

Apparatus 400 can select and resolve up to two leading unresolved operations even if apparatus 400 cannot find an appropriate coupling based on coupling scores. Therefore, apparatus 400 can increase a probability of reducing the number of inserted swap operations in the operation sequence in this situation.

In another embodiment, two multi-qubit operations using the same logical qubit are considered not to be dependent on each other if the logical qubits is not changed by them. In this case, resolving section 440 selects, at S810, the two leading unresolved operations to be resolved based on the pair score under the condition that these two leading unresolved operations do not use a common logical qubit. If the blocking set does not include two leading unresolved operations that do not use a common logical qubit, apparatus 400 may select and resolve one leading unresolved operation in the blocking set.

In another embodiment, apparatus 400 can select and resolve one leading unresolved operation instead of selecting and resolving up to two leading unresolved operations at S800 and S810, or if the pair score indicates that it is not efficient to resolve a pair of leading unresolved operations (e.g., the minimum pair score is not less than a threshold).

For selecting one leading unresolved operation to be resolved, resolving section 440 may randomly select one leading unresolved operation among leading unresolved operations in the blocking set. In another implementation, calculating section 430 calculates a score for each leading unresolved operation and resolving section 440 selects a leading unresolved operation having the best score (e.g., highest or lowest score depends on the type of the score).

For example, calculating section 430 calculates the score that represents a minimum number of swap operations necessary for resolving each leading unresolved operation. In this case, resolving section 440 selects a leading unresolved operation having the minimum score. In another example, calculating section 430 calculates the score that represents a number of unresolved operations that depend from each leading unresolved operation. Calculating section 430 may count a number of unresolved operations directly depend from each leading unresolved operation, or may also count a number of unresolved operations indirectly depend from each leading unresolved operation. In this case, resolving section 440 selects a leading unresolved operation having the maximum score.

Figure 9:
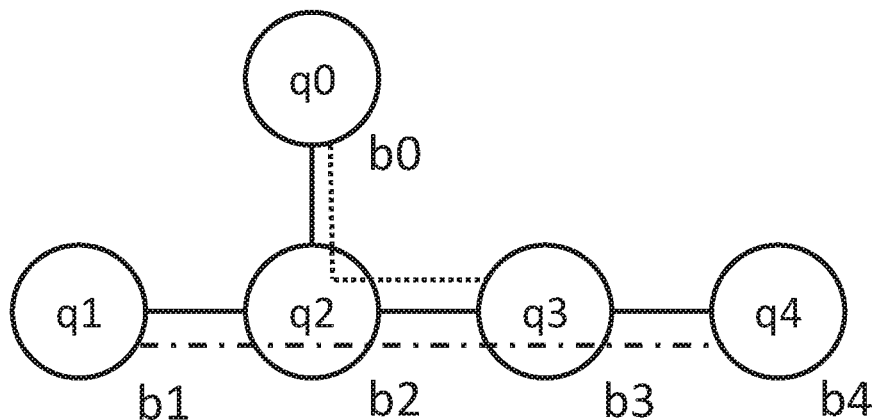
FIG. 9 shows an example of a third coupling score according to an embodiment of the present invention.
Figure 12:
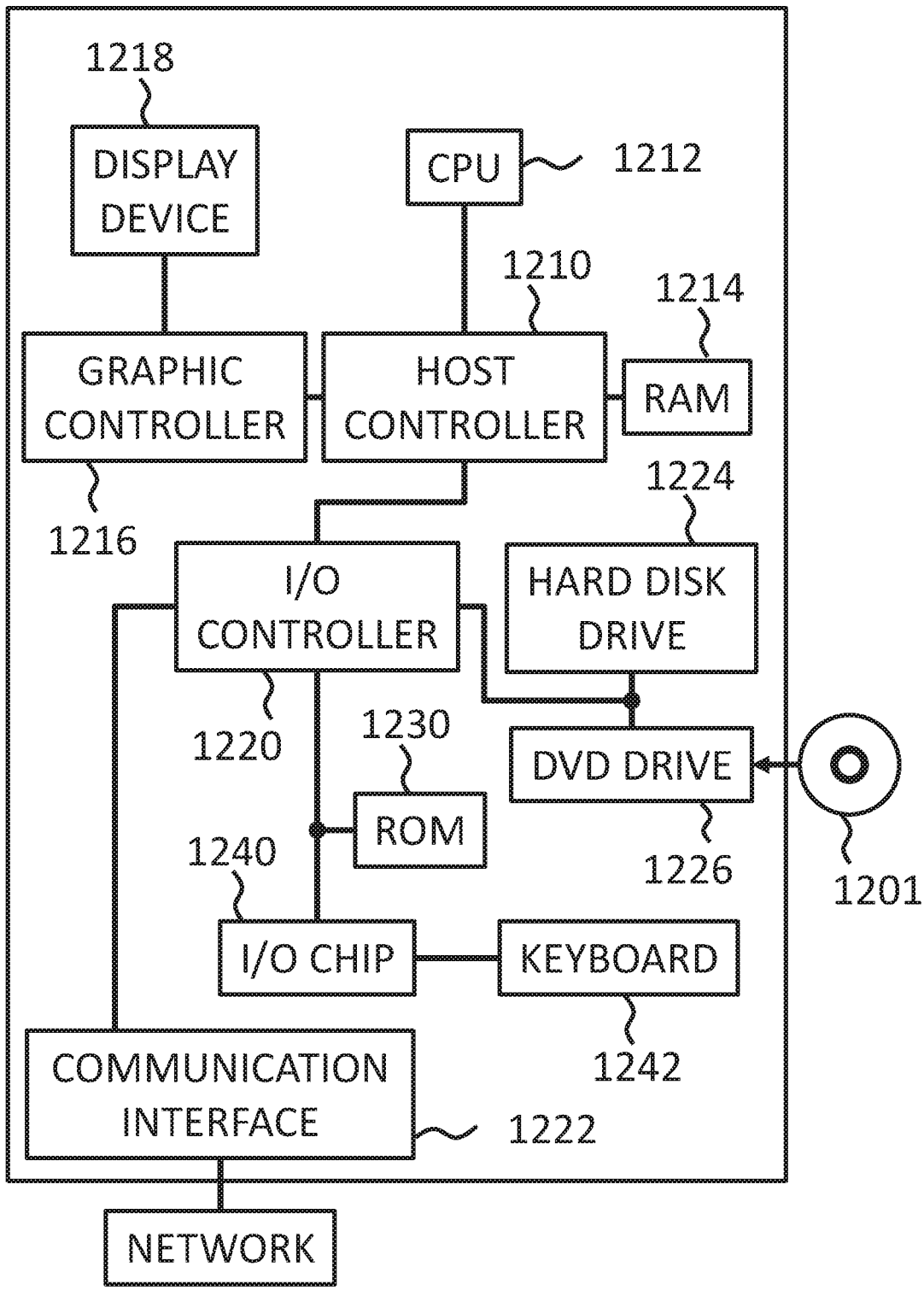
FIG. 12 shows an exemplary hardware configuration of a computer according to an embodiment of the present invention.

FIG. 9 shows an example of a third coupling score according to an embodiment of the present invention. The third coupling score shown in FIG. 9 can be calculated by, for example, apparatus 140 or apparatus 400 and its components that were explained in reference to FIG. 1 or 4. The calculation of the third coupling score in FIG. 9 can be performed as S730 in FIG. 7. While the calculation of the third coupling score in FIG. 9 will be explained in reference to apparatus 400 and its components, the calculation can be performed by other apparatus having different components as well.

The third coupling score of each coupling represents an ability to assist a swapping of a first logical qubit to be used by a first unresolved operation and a second logical qubit to be used by a second unresolved operation to reduce the shortest path length of the first and second unresolved operations among the plurality of unresolved operations. The purpose of using the third coupling score is to increase the efficiency of moving logical qubits to be used by unresolved operations per swap operation. If a first logical qubit to be used by a first unresolved operation and a second logical qubit to be used by a second unresolved operation are stored in a pair of physical qubits that are coupled, and the shortest path lengths of both of the first and second unresolved operation are reduced by one swap operation, i.e.— swapping the first logical qubit and the second logical qubit, then this is more efficient than moving the first logical qubit and the second logical qubit separately, because that would need two swap operations.

For example, there are a first unresolved operation CNOT(b0,b3) and a second unresolved operation CNOT(b1, b4) to be executed on the physical circuit in FIG. 9. In this example, these operations are in the set U, and the current layout l is {b0:q0, b1:q1, b2:q2, b3:q3, b4:q4}.

In a first selection, b0 in q0 and b2 in q2 are swapped first, and then CNOT(b0, b3) can be resolved. Then, CNOT(b1, b4) can be resolved by inserting two swap operations (i.e. SWAP(q1,q2) and SWAP(q2,q3) as an example). In the first selection, three swap operations are inserted in the operation sequence.

In a second selection, b1 in q1 and b2 in q2 are swapped first, and then b1 is moved in q2. Next, b1 in q2 and b3 in q3 are swapped, and then b3 is moved in q2 and b1 is moved in q3. Then, CNOT(b0,b3) can be performed between b0 in q0 and b3 in q2, and CNOT(b1,b4) can be performed between b1 in q3 and b4 in q4. In the second selection, a first logical qubit b3 of CNOT(b0,b3) and a second logical qubit b1 of CNOT(b1,b4) are swapped to reduce the shortest path length of CNOT(b0,b3) and CNOT(b1,b4), and therefore the number of inserted swap operations is reduced. The first swapping on the coupling between q1 and q2 assisted the second swapping between b1 in q2 and b3 in q3. The purpose of the third coupling score is to represent an ability to assist a swapping such as the second swapping, and give a higher coupling score to SWAP(q1,q2) than SWAP(q0,q2) in the situation in FIG. 9.

In an implementation, calculating section 430 calculates the third coupling score (also referred to as a "subscore") of a coupling ($q_0$, $q_1$) as shown in the following expression (3).

$$\text{subscore}((q_0,q_1),l,U;G) = -\text{mean}_{\{(b_0,b_1)\in MG((q_0,q_1);l)\}}\{\Sigma_{\{(b_i,b_j)\in U\}}(\text{include}(l(b_0),SP_G(l(b_i),l(b_j)))+\text{include}(l(b_1),SP_G(l(b_i),l(b_j))))\} \quad (3)$$

Here, l is the current layout, U is a set of all unresolved operations or a subset of unresolved operations, and G is a coupling graph that represents the physical quantum computing device, such as quantum computing device 110. MG(($q_0$, $q_1$); l) is a subset of operations in the set U including unresolved operations that use logical qubits $q_0$ or $q_1$ in the current layout l. For example, MG((q0,q2); l) in FIG. 9 is {(b0,b3)}. In another implementation, MG(($q_0$, $q_1$); l) is a subset of operations in a set other than the set U.

For example, the set U can be a set of all unresolved operations or a subset of unresolved operations, whereas MG(($q_0$, $q_1$); l) is a subset of operations in the blocking set.

$SP_G(l(b_i),l(b_j))$ (also referred to as "SP_G(l(bi),l(bj))" in FIG. 9) is a shortest path between a physical qubit storing the logical qubit $b_i$ and a physical qubit storing the logical qubit $b_j$ on the coupling graph G in the current layout l. "include (q,P)" represents whether a physical qubit q is included in a path P. In this embodiment, include(q,P) is 1 if the physical qubit q is included in a path P and otherwise 0.

The sum in mean{ } in expression (3) represents the sum of the number of unresolved operations in the set U that has a logical qubit $b_0$ in the shortest path and the number of unresolved operations in the set U that has a logical qubit $b_1$ in the shortest path. ($b_0$, $b_1$) is selected from a pair of logical qubits used by an unresolved operation in the set U that uses a logical qubit stored in at least one of physical qubits $q_0$ and $q_1$. If there are two or more unresolved operations that use a logical qubit stored in at least one of physical qubits $q_0$ and $q_1$, then the sum in mean{ } is averaged. The third coupling score of the coupling ($q_0$, $q_1$) is based on the negative value of the mean or average.

For example, the third coupling score of the coupling (q0,q2) is −3 because CNOT(b0,b3) has a logical qubit stored in at least one of q0 and q2, b0 is included in the shortest path of CNOT(b0,b3) but not included in the shortest path of CNOT(b1,b4), b3 is included in the shortest paths of CNOT(b0,b3) and CNOT(b1,b4), and therefore the sum in the mean{ } is 3. On the other hand, the third coupling score of the coupling (q1,q2) is −2 because b1 and b4 are included in the shortest path of CNOT(b1,b4) but not in the shortest path of CNOT(b0,b3).

In this implementation, a coupling tends to have a higher third coupling score if operations having a logical qubit stored in at least one physical qubit coupled by the coupling includes more logical qubits to be used in the unresolved operations in the set U. Apparatus 400 has a higher priority to select such coupling, and therefore apparatus 400 can reduce the number of swap operations inserted in the operation sequence.

FIGS. 10 and 11 show an example of a pair score according to an embodiment of the present invention. In reference to FIGS. 10 and 11, calculation of a pair score representing at least one of a depending cost and a resolving cost is explained. The pair score shown in reference to FIGS. 10 and 11 can be calculated by, for example, apparatus 140 or apparatus 400 and its components that were explained in reference to FIG. 1 or 4. The calculation of the pair score in reference to FIGS. 10 and 11 can be performed as S800 in FIG. 8. While the calculation of the pair score in reference to FIGS. 10 and 11 will be explained in reference to apparatus 400 and its components, the calculation can be performed by other apparatus having different components as well. In this embodiment, a pair score represents at least one of a depending cost and a resolving cost.

(1) Depending Cost

The depending cost represents a dependency of a pair of leading unresolved operations. In this embodiment, this dependency is measured based on the number of logical qubits used by unresolved operations in the set U included in shortest paths of first and second operations of the pair of leading unresolved operations. Expression (4) shows an example of dependency cost.

$$dc((b_{i0}, b_{i1}), (b_{j0}, b_{j1}); l, U, G) = \sum_{(b_0,b_1)\in U} \sum_{b\in(b_0,b_1),k\in(i,j)} \text{include}(l(b), SP_G(l(b_{k0}), l(b_{k1}))) \quad (4)$$

Here, $SP_G(l(b_{k0}), l(b_{k1}))$ is a shortest path of $(b_{i0}, b_{i1})$ if k=i and a shortest path of $(b_{j0}, b_{j1})$ if k=j. b is a first or second logical qubit of each unresolved operation in the set U. The expression (4) counts the number of logical qubits used by unresolved operations in the set U included in shortest paths of $(b_{i0}, b_{i1})$ and $(b_{j0}, b_{j1})$.

If the dependency cost is high, many unresolved operations are affected when resolving the corresponding pair of leading unresolved operations. Therefore, resolving section 440 selects a pair of leading unresolved operations in the blocking set that has a lower or lowest dependency cost, and resolves the selected pair of leading unresolved operations.

By using a dependency cost as a pair score, apparatus 400 can select and resolve a pair of leading unresolved operations which has less dependency than other unresolved operations. Therefore, apparatus 400 can change the blocking set with the minimum influence on other unresolved operations. By changing the blocking set, apparatus 400 may have a greater chance to select a coupling having a coupling score that is not less than the threshold in the next iteration.

(2) Resolving Cost

The resolving cost represents a cost for resolving a pair of leading unresolved operations. In this embodiment, the resolving cost is measured based on the relationship between the pair of leading unresolved operations, and not influenced by other unresolved operations. An example of the resolving cost is shown in FIGS. 10 and 11.

FIG. 10 shows an example of a program code for calculating a resolving cost rc between an unresolved operation having a shortest path pi and an unresolved operation having a shortest path pj. path_minus(pi,pj) is a function that removes couplings included in path pj from path pi. In other words, path_minus(pi,pj) is a set of fragments or subpaths of path pi after removing couplings included in path pj. For example, if pi is q0→q2→q3 and pj is q1→q2→q3→q4 as shown in FIG. 9, path_minus(pi,pj)={q0→q2} and path_minus(pj,pi)={q1→q2, q3→q4} since coupling q2→q3 is included in pj and pi.

In FIG. 10, resolving cost rc is calculated based on path_minus(pi,pj) and path_minus(pj,pi) which are assigned to subpaths_i_j and subpaths_j_i, respectively. len(subpaths_i_j) is a size of the set subpaths_i_j, and represents the number of fragments of path pi in subpaths_i_j. In the same way, len(subpaths_j_i) represents the number of fragments of path pj in subpaths_j_i. In this example, resolving cost is calculated based on the number of fragments of path pi and the number of fragments of path pj after removing couplings included in both of the paths pi and pj.

FIG. 11 shows the resolving cost rc calculated by executing the program code in FIG. 10. In this example, resolving cost rc is calculated between a pair of leading unresolved operations in the blocking set. These leading unresolved operations do not depend on each other. This means that they do not share a logical qubit. Therefore, the resolving cost rc=1 in (subpaths_i_j,subpaths_j_i)=(0,0), (0,1), or (1,0) is not actually used. In another embodiment, two multi-qubit operations using the same logical qubit are considered not to be dependent on each other if the logical qubits is not changed by them. In this case, the resolving cost rc is calculated only for a pair of leading unresolved operations that do not use a common logical qubit.

The resolving cost rc=−1 in (subpaths_i_j,subpaths_j_i)=(2,1) and (1,2). This is same or similar to the relationship between CNOT(b0,b3) and CNOT(b1,b4) in FIG. 9 that CNOT(b0,b3) has a fragment q0→q2, and CNOT(b1,b4) has fragments q1→q2 and q3→q4. For calculating the resolving cost, each fragment may have a shortest path length of more than 1. As explained in reference to FIG. 9, it is possible to effectively swap logical qubits in this relationship. Therefore, resolving cost rc is less than that of (subpaths_i_j,subpaths_j_i)=(2,0) and (0,2). The resolving cost rc is same to (subpaths_i_j,subpaths_j_i)=(2,1) and (1,2) in (subpaths_i_j,subpaths_j_i)=(2,2), because it is possible to modify the relationship between paths pi and pj to (subpaths_i_j,subpaths_j_i)=(2,1) or (1,2) by moving one logical qubit in pi on path pj or vice versa.

The resolving cost rc=0 in (subpaths_i_j,subpaths_j_i)=(2,0) and (0,2). If one path is included in the middle of another path, two leading unresolved operations must be separately resolved, and therefore there is no decrease in cost.

The resolving cost rc=0 in (subpaths_i_j,subpaths_j_i)=(1,1) and pi=subpaths_i_j. If path pi and pj do not share a coupling (i.e. pi=subpaths_i_j), then two leading unresolved operations must be separately resolved, and therefore there is no decrease in cost.

The resolving cost rc=−1 in (subpaths_i_j,subpaths_j_i)=(1,1) and pi≠subpaths_i_j. An example of this situation is in FIG. 9 after swapping a pair of logical qubits b1 and b2 in a pair of physical qubits q1 and q2. In this situation, it is possible to effectively swap logical qubits as explained in reference to FIG. 9.

By using a resolving cost as a pair score, apparatus 400 can select and resolve a pair of leading unresolved operations, which adds some efficiency to resolving the pair of leading unresolved operations. Therefore, apparatus 400 can efficiently change the blocking set, and may obtain a chance to select a coupling having the maximum coupling score that is not less than the threshold next time.

In this embodiment, calculating section 430 calculates a dependency cost as a first pair score for each pair of leading unresolved operations in the blocking set. Calculating section 430 may calculate the first pair score by using all unresolved operations as the plurality of unresolved operations in the set U or a subset of all unresolved operations as the set U. If there are two or more candidates of the pair of leading unresolved operations with respect to these first pair scores, then calculating section 430 may further calculate a dependency cost as a second pair score by using the blocking set as the set U. Resolving section 440 selects a pair of leading unresolved operations having the lowest second pair score among the candidates selected based on the first pair score, and resolves the pair of leading unresolved operations.

If there are two or more candidates of the pair of leading unresolved operations having the lowest first and second pair score, then calculating section 430 calculates a resolving cost as a third pair score for each pair of leading unresolved operations in the blocking set. Resolving section 440 selects a pair of leading unresolved operations having the lowest third pair score among the candidates selected based on the first and second pair score and resolves the pair of leading unresolved operations. In another embodiment, apparatus 400 uses only one or two of any of the first, second, and third pair scores.

In this embodiment, apparatus 400 calculates multiple types of coupling scores. In another embodiments, apparatus 400 calculates a coupling score including components or effects of two or more types of coupling scores, such as first, second, and third coupling scores. In the same way, apparatus 400 calculates a pair score including components or effects of two or more types of pair scores, such as first, second, and third pair scores.

In another embodiment, apparatus 400 uses at least one of the coupling scores having a different expression but based on the same or similar inputs. In this embodiment, a coupling score is better if it is higher, but in another embodiment, a coupling score may be better if it is lower. A variety of other changes can be applied to the calculation of coupling scores including adding influences of one or more other parameters, adding a constant, multiplying by a coefficient, and so on. In the same way, a variety of changes can be applied to the calculation of any other parameters and functions such as at least one of the pair scores, path lengths, discount rates, include functions, and so on.

In the above-mentioned embodiments, the coupling scores are used for inserting a swap operation in the operation sequence. In another embodiment, the coupling scores are used for allocating a plurality of logical qubits to a plurality of physical qubits in the initial layout.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 11 shows an example of a computer 1200 in which aspects of the present invention may be wholly or partly embodied. A program that is installed in the computer 1200 can cause the computer 1200 to function as or perform operations associated with apparatuses of the embodiments of the present invention or one or more sections thereof, and/or cause the computer 1200 to perform processes of the embodiments of the present invention or steps thereof. Such a program may be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, a graphics controller 1216, and a display device 1218, which are mutually connected by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input/output units such as a ROM 1230 and a keyboard 1242, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on the display device 1218.

The communication interface 1222 communicates with other electronic devices via a network. The hard disk drive 1224 stores programs and data used by the CPU 1212 within the computer 1200. The DVD-ROM drive 1226 reads the programs or the data from the DVD-ROM 1201, and provides the hard disk drive 1224 with the programs or the data via the RAM 1214. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a parallel port, a serial port, a keyboard port, a mouse port, and the like to the input/output controller 1220.

A program is provided by computer readable media such as the DVD-ROM 1201 or the IC card. The program is read from the computer readable media, installed into the hard disk drive 1224, RAM 1214, or ROM 1230, which are also examples of computer readable media, and executed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffering region provided in a recording medium such as the RAM 1214, the hard disk drive 1224, the DVD-ROM 1201, or the IC card, and transmits the read transmission data to a network or writes reception data received from a network to a reception buffering region or the like provided on the recording medium.

In addition, the CPU 1212 may cause all or a necessary portion of a file or a database to be read into the RAM 1214, the file or the database having been stored in an external recording medium such as the hard disk drive 1224, the DVD-ROM drive 1226 (DVD-ROM 1201), the IC card, etc., and perform various types of processing on the data on the RAM 1214. The CPU 1212 may then write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 1200. In addition, a recording medium such as a hard disk or a RAM provided in a server system connected to a dedicated communication network or the Internet can be used as the computer readable media, thereby providing the program to the computer 1200 via the network.

While the embodiments of the present invention have been described, the technical scope of the invention is not limited to the above described embodiments. It will be apparent to persons skilled in the art that various alterations and improvements can be added to the above-described embodiments. It should also apparent from the scope of the claims that the embodiments added with such alterations or improvements are within the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer-implemented method comprising:
   obtaining an operation sequence including a plurality of operations to be executed on a quantum computing device, the quantum computing device including a plurality of physical qubits and a plurality of couplings, each physical qubit storing a logical qubit, each coupling being a connection between a pair of physical qubits configured to facilitate execution of an operation on a pair of logical qubits stored in the pair of physical qubits;
   finding a blocking set of operations including at least one leading unresolved operation in the operation sequence;
   calculating a first coupling score for each coupling of the plurality of couplings based on total reduction of shortest path lengths of a plurality of unresolved operations of the plurality of operations, wherein a shortest path length of an unresolved operation represents a minimum distance through couplings on the quantum computing device between a pair of physical qubits storing a pair of logical qubits to be used by the corresponding unresolved operation, and wherein the total reduction of shortest path lengths is a total of the amounts by which each shortest path length would be reduced by swapping a pair of logical qubits stored in a pair of physical qubits connected by the corresponding coupling;
   selecting a coupling based on the first coupling score of each coupling; and
   updating the blocking set by removing any leading unresolved operations from the blocking set that can be performed after swapping a pair of logical qubits stored in a pair of physical qubits connected by the selected coupling.

2. The computer-implemented method of claim 1, wherein the updating includes updating the blocking set by adding a new leading unresolved operation in the operation sequence to the blocking set, the new leading unresolved operation becomes a leading unresolved operation after the removing the leading unresolved operation from the blocking set.

3. The computer-implemented method of claim 1, wherein the plurality of unresolved operations is a subset of all unresolved operations in the operation sequence.

4. The computer implemented method of claim 1, wherein the calculating the first coupling score includes determining the plurality of unresolved operations based on a distance between an operation in the blocking set and each unresolved operation in a dependency graph of the plurality of operations.

5. The computer-implemented method of claim 1, further comprising inserting a swap operation for swapping a pair of logical qubits stored in a pair of physical qubits connected by the selected coupling in the operation sequence preceding a leading unresolved operation using at least one logical qubit swapped by the swap operation.

6. The computer implemented method of claim 1, wherein the calculating the first coupling score includes calculating the first coupling score of each coupling based on a weighted sum of reduction of a shortest path length of each unresolved operation.

7. The computer-implemented method of claim 6, wherein the calculating the first coupling score includes calculating a weight of reduction of a shortest path length of an unresolved operation of interest based on the number of unresolved operations in a dependency graph of the plurality of operations between the unresolved operation of interest and the at least one leading unresolved operation in the blocking set.

8. The computer implemented method of claim 6, wherein the calculating the first coupling score includes calculating a weight of reduction of a shortest path length of an unresolved operation of interest based on a maximum distance on a dependency graph of the plurality of operations between the unresolved operation of interest and the at least one leading unresolved operation in the blocking set.

9. The computer-implemented method of claim 1, further comprising calculating a second coupling score of each coupling of the plurality of couplings based on reduction of a shortest path length of each leading unresolved operation in the blocking set, and
   wherein the selecting includes selecting a coupling based on the second coupling score of each coupling.

10. The computer-implemented method of claim 1, further comprising resolving up to two leading unresolved operations in the blocking set in response to the first coupling score for every coupling being lower than a threshold.

11. The computer-implemented method of claim 10, wherein the calculating includes calculating a pair score representing at least one of a depending cost and a resolving cost of each pair of leading unresolved operations in the blocking set, the depending cost representing a dependency of the corresponding pair of leading unresolved operations, the resolving cost representing a cost for resolving the corresponding pair of leading unresolved operations, and
   wherein the resolving includes selecting two of the at least one leading unresolved operations to be resolved based on the pair score.

12. The computer-implemented method of claim 1, further comprising calculating a third coupling score of each coupling of the plurality of couplings, the third coupling score of each coupling representing an ability to assist a swapping of a first logical qubit to be used by a first unresolved operation and a second logical qubit to be used by a second unresolved operation to reduce the shortest path length of the first and second unresolved operations among the plurality of unresolved operations, and wherein the selecting includes selecting a pair of physical qubits to be swapped based on the third coupling score of each coupling.

13. A computer program product including one or more computer readable storage mediums collectively storing program instructions that are executable by a processor or programmable circuitry to cause the processor or programmable circuitry to perform operations comprising:

obtaining an operation sequence including a plurality of operations to be executed on a quantum computing device, the quantum computing device including a plurality of physical qubits and a plurality of couplings, each physical qubit storing a logical qubit, each coupling being a connection between a pair of physical qubits configured to facilitate execution of an operation on a pair of logical qubits stored in the pair of physical qubits;

finding a blocking set of operations including at least one leading unresolved operation in the operation sequence;

calculating a first coupling score for each coupling of the plurality of couplings based on total reduction of shortest path lengths of a plurality of unresolved operations of the plurality of operations, wherein a shortest path length of an unresolved operation represents a minimum distance through couplings on the quantum computing device between a pair of physical qubits storing a pair of logical qubits to be used by the corresponding unresolved operation, and wherein the total reduction of shortest path lengths is a total of the amounts by which each shortest path length would be reduced by swapping a pair of logical qubits stored in a pair of physical qubits connected by the corresponding coupling;

selecting a coupling based on the first coupling score of each coupling; and updating the blocking set by removing any leading unresolved operations from the blocking set that can be performed after swapping a pair of logical qubits stored in a pair of physical qubits connected by the selected coupling.

14. The computer program product of claim 13, wherein the updating includes updating the blocking set by adding a new leading unresolved operation in the operation sequence to the blocking set, the new leading unresolved operation becomes a leading unresolved operation after the removing the leading unresolved operation from the blocking set.

15. The computer program product of claim 13, wherein the plurality of unresolved operations is a subset of all unresolved operations in the operation sequence.

16. The computer program product of claim 13, wherein the calculating the first coupling score includes calculating the first coupling score of each coupling based on a weighted sum of reduction of a shortest path length of each unresolved operation.

17. The computer program product of claim 13, wherein the calculating the first coupling score includes calculating a weight of reduction of a shortest path length of an unresolved operation of interest based on the number of unresolved operations on a dependency graph of the plurality of operations between the unresolved operation of interest and leading unresolved operations in the blocking set.

18. The computer program product of claim 13, wherein the calculating the first coupling score includes calculating a weight of reduction of a shortest path length of an unresolved operation of interest based on a maximum distance on a dependency graph of the plurality of operations between the unresolved operation of interest and a leading unresolved operation in the blocking set.

19. An apparatus comprising:
a processor or a programmable circuitry; and
one or more computer readable mediums collectively including instructions that, when executed by the processor or the programmable circuitry, cause the processor or the programmable circuitry to:

obtain an operation sequence including a plurality of operations to be executed on a quantum computing device, the quantum computing device including a plurality of physical qubits and a plurality of couplings, each physical qubit storing a logical qubit, each coupling being a connection between a pair of physical qubits configured to facilitate execution of an operation on a pair of logical qubits stored in the pair of physical qubits;

find a blocking set of operations including at least one leading unresolved operation in the operation sequence;

calculate a first coupling score for each coupling of the plurality of couplings based on total reduction of shortest path lengths of a plurality of unresolved operations of the plurality of operations, wherein a shortest path length of an unresolved operation represents a minimum distance through couplings on the quantum computing device between a pair of physical qubits storing a pair of logical qubits to be used by the corresponding unresolved operation, and wherein the total reduction of shortest path lengths is a total of the amounts by which each shortest path length would be reduced by swapping a pair of logical qubits stored in a pair of physical qubits connected by the corresponding coupling;

select a coupling based on the first coupling score of each coupling; and update the blocking set by removing any leading unresolved operations from the blocking set that can be performed after swapping a pair of logical qubits stored in a pair of physical qubits connected by the selected coupling.

20. The apparatus of claim 19, wherein the updating includes updating the blocking set by adding a new leading unresolved operation in the operation sequence to the blocking set, the new leading unresolved operation becomes a leading unresolved operation after the removing the leading unresolved operation from the blocking set.

21. The apparatus of claim 19, wherein the plurality of unresolved operations is a subset of all unresolved operations in the operation sequence.

22. The apparatus of claim 19, wherein the calculating the first coupling score includes calculating the first coupling score of each coupling based on a weighted sum of reduction of a shortest path length of each unresolved operation.

23. The apparatus of claim 19, wherein the calculating the first coupling score includes calculating a weight of reduction of a shortest path length of an unresolved operation of interest based on the number of unresolved operations on a dependency graph of the plurality of operations between the unresolved operation of interest and leading unresolved operations in the blocking set.

24. The apparatus of claim 19, wherein the calculating the first coupling score includes calculating a weight of reduction of a shortest path length of an unresolved operation of interest based on a maximum distance on a dependency graph of the plurality of operations between the unresolved operation of interest and a leading unresolved operation in the blocking set.

25. A quantum computing system comprising:
- a quantum computing device including a plurality of physical qubits and a plurality of couplings, each physical qubit storing a logical qubit, each coupling being a connection between a pair of physical qubits configured to facilitate execution of an operation on a pair of logical qubits stored in the pair of physical qubits; and
- an apparatus for mapping a plurality of operations in an operation sequence to be executed on the quantum computing device, wherein the apparatus includes:

obtaining section for obtaining the operation sequence;

finding section for finding a blocking set of operations including at least one leading unresolved operation in the operation sequence;

calculating section for calculating a first coupling score for each coupling of the plurality of couplings based on total reduction of shortest path lengths of a plurality of unresolved operations of the plurality of operations, wherein a shortest path length of an unresolved operation represents a minimum distance through couplings on the quantum computing device between a pair of physical qubits storing a pair of logical qubits to be used by the corresponding quantum operation, and wherein the total reduction of shortest path lengths is a total of the amounts by which each shortest path length would be reduced by swapping a pair of logical qubits stored in a pair of physical qubits connected by the corresponding coupling;

selecting section for selecting a coupling based on the first coupling score of each coupling; and updating section for updating the blocking set by removing any leading unresolved operations from the blocking set that can be performed after swapping a pair of logical qubits stored in a pair of physical qubits connected by the selected coupling.

* * * * *